United States Patent
Dewa et al.

(10) Patent No.: US 11,102,444 B2
(45) Date of Patent: Aug. 24, 2021

(54) RECEPTION APPARATUS, TRANSMISSION APPARATUS, AND DATA PROCESSING METHOD

(71) Applicant: SONY CORPORATION, Tokyo (JP)

(72) Inventors: Yoshiharu Dewa, Tokyo (JP); Naohisa Kitazato, Tokyo (JP); Yasuaki Yamagishi, Kanagawa (JP); Jun Kitahara, Shizuoka (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/305,846

(22) PCT Filed: Sep. 3, 2014

(86) PCT No.: PCT/JP2014/073148
§ 371 (c)(1),
(2) Date: Oct. 21, 2016

(87) PCT Pub. No.: WO2015/173975
PCT Pub. Date: Nov. 19, 2015

(65) Prior Publication Data
US 2017/0048485 A1  Feb. 16, 2017

(30) Foreign Application Priority Data

May 15, 2014 (JP) .............................. JP2014-101126

(51) Int. Cl.
*H04N 7/025* (2006.01)
*H04N 21/431* (2011.01)
(Continued)

(52) U.S. Cl.
CPC .......... *H04N 7/025* (2013.01); *H04N 21/431* (2013.01); *H04N 21/435* (2013.01);
(Continued)

(58) Field of Classification Search
CPC .... H04N 7/173; H04N 7/025; H04N 21/4307; H04N 21/435; H04N 21/4884; H04N 21/8543
(Continued)

(56) References Cited

U.S. PATENT DOCUMENTS

2010/0092154 A1   4/2010  McCrossan et al.
2013/0302014 A1   11/2013  Uchimura
(Continued)

FOREIGN PATENT DOCUMENTS

JP   2009-283124 A   12/2009
JP   2012-169885 A   9/2012
(Continued)

OTHER PUBLICATIONS

Glenn Adams, et al., "Timed Text Markup Language (TTML) 1.0 (Second Edition)," W3C (World Wide Web Consortium), 10 Timing, < http://www.w3.org/TR/2013/WD-ttaf1-dfxp-20130131/ , > Jan. 31, 2013, (144 pages).

(Continued)

*Primary Examiner* — John W Miller
*Assistant Examiner* — Sihar A Karwan
(74) *Attorney, Agent, or Firm* — Oblon, McClelland, Maier & Neustadt, L.L.P.

(57) ABSTRACT

Provided are an apparatus and a method that are capable of performing reliable display control with no caption display interruption of the TTML caption data. Specifically, when a set value of the caption display end time specification attribute of the TTML caption data is the continuous display instruction value, memory storing and display processing of caption data currently displayed are continued even after reproduction end timing of an image file, and switching processing of TTML caption data files is performed. When a set value of the caption display start time specification (Continued)

attribute of the TTML caption data is the continuous display instruction value, whether or not there is a text string, display processing of the text string is continued, is determined, and when there is the text string, the displayed text is continuously displayed. With the processing, it is possible to achieve display control with no caption display interruption of the TTML caption data.

14 Claims, 16 Drawing Sheets

(51) Int. Cl.
  *H04N 21/458* (2011.01)
  *H04N 21/43* (2011.01)
  *H04N 21/8547* (2011.01)
  *H04N 21/435* (2011.01)
  *H04N 21/488* (2011.01)
  *H04N 21/8543* (2011.01)

(52) U.S. Cl.
  CPC ....... *H04N 21/4307* (2013.01); *H04N 21/458* (2013.01); *H04N 21/4884* (2013.01); *H04N 21/8543* (2013.01); *H04N 21/8547* (2013.01)

(58) Field of Classification Search
  USPC .......................................................... 725/131
  See application file for complete search history.

(56) References Cited

U.S. PATENT DOCUMENTS

2014/0208351 A1* 7/2014 Moore ............... H04N 21/4856
  725/35
2014/0229970 A1* 8/2014 Besehanic .............. H04H 60/43
  725/20

FOREIGN PATENT DOCUMENTS

JP      2015-220746 A    12/2015
WO   WO 2013/088966      6/2013

OTHER PUBLICATIONS

International Search Report dated Dec. 2, 2014 in PCT/JP2014/073148 filed Sep. 3, 2014.
Extended European Search Report dated Sep. 25, 2017 in European Patent Application No. 14892022.6.
Notification of Reason(s) for Refusal issued in corresponding Japanese Application No. 2014-101126 dated Feb. 6, 2018, (with English translation).
Notification of Reason(s) for Refusal dated Mar. 26, 2019 in corresponding Japanese Patent Application No: 2018-140848 (with English translation) (6 pages).
N14640, ISO/IEC JTC 1/SC 29/WG 11, Apr. 4, 2014 "Information technology—High efficiency coding and media delivery in heterogeneous environments—Part 11: MPEG Media Transport Composition Information" (40 pages).
Japanese Office Action dated Jun. 11, 2019 in Japanese Patent Application No. 2018-140848 (with English translation), 8 pages.

* cited by examiner

RECEPTION APPARATUS, TRANSMISSION APPARATUS, AND DATA PROCESSING METHOD

TECHNICAL FIELD

The present disclosure relates to a reception apparatus, a transmission apparatus, and a data processing method. In more detail, the present disclosure relates to a reception apparatus, a transmission apparatus, and a data processing method that transmit/receive caption data and perform processing on the caption data.

BACKGROUND ART

There exist various methods for superimposing captions on a picture and displaying them. TTML (Timed Text Markup Language) is increasingly used. In the TTML, the caption data in the XML (Extensible Markup Language) format is used, and the display area or display timing can be controlled.

The TTML has features of being capable of cooperating with a web application such as HTML5.

Note that the TTML is described in, for example, Patent Document 1 (Japanese Patent Application Laid-open No. 2012-169885).

Patent Document 1: Japanese Patent Application Laid-open No. 2012-169885

SUMMARY

Problem to be Solved

The TTML caption data that is the above-mentioned caption data has a configuration in which information representing the display timing of the caption as well as the caption data to be displayed can be described. However, when switching processing of TTML files is performed, display of the caption data may be interrupted.

It is an object of the present disclosure to provide a reception apparatus, a transmission apparatus, and a data processing method that achieve processing capable of eliminating caption display interruption in the caption display processing using control information of the TTML caption data.

Means for Solving the Problem

A reception apparatus according to a first aspect of the present disclosure includes:

a communication unit that receives TTML (Timed Text Markup Language) caption data; and a data processing unit that performs caption display control, the TTML caption data being applied to the caption display control, in which the TTML caption data is data having a continuous display instruction value for performing continuous display processing of captions currently displayed, as a value of at least one of a caption display end time specification attribute and a caption display start time specification attribute.

A transmission apparatus according to a second aspect of the present disclosure includes:

a data processing unit that generates TTML (Timed Text Markup Language) caption data; and a communication unit that transmits the TTML caption data, in which the TTML caption data is data having a continuous display instruction value for performing continuous display processing of captions currently displayed, as a value of at least one of a caption display end time specification attribute and a caption display start time specification attribute.

A data processing method according to a third aspect of the present disclosure, which is executed by a reception apparatus, includes:

receiving, by a communication unit, TTML (Timed Text Markup Language) caption data;

performing, by a data processing unit, caption display control, the TTML caption data being applied to the caption display control, in which the TTML caption data is data having a continuous display instruction value for performing continuous display processing of captions currently displayed, as a value of at least one of a caption display end time specification attribute and a caption display start time specification attribute.

A data processing method according to a fourth aspect of the present disclosure, which is executed by a transmission apparatus, includes:

generating, by a data processing unit, TTML (Timed Text Markup Language) caption data; and transmitting, by a communication unit, the TTML caption data, in which the TTML caption data is data having a continuous display instruction value for performing continuous display processing of captions currently displayed, as a value of at least one of a caption display end time specification attribute and a caption display start time specification attribute.

These and other objects, features and advantages of the present disclosure will become more apparent in light of the following detailed description on the basis of the embodiments of the present disclosure to be described later or the accompanying drawings. Note that, the "system" in this specification refers to a logical collective configuration of a plurality of apparatuses, and those apparatuses having respective configurations are not necessarily provided in the same casing.

Effects

According to the configuration of an embodiment of the present disclosure, it is possible to achieve an apparatus and a method that are capable of performing reliable display control with no caption display interruption of the TTML caption data.

Specifically, when a set value of the caption display end time specification attribute of the TTML caption data is the continuous display instruction value, memory storing and display processing of caption data currently displayed are continued even after reproduction end timing of an image file, and switching processing of TTML caption data files is performed. In the case where a set value of the caption display start time specification attribute of the TTML caption data is the continuous display instruction value, whether or not there is a text string of which display processing is continued is determined, and when there is the text string, the displayed text is continuously displayed.

According to this configuration, it is possible to achieve display control with no caption display interruption of the TTML caption data.

Note that the effects described in the specification are merely examples. The effects are not limited to the effects described in the specification. Further, the present disclosure may have effects other than the exemplified effects.

DESCRIPTION OF PREFERRED EMBODIMENTS

Hereinafter, details of the reception apparatus, the transmission apparatus, and the data processing method according to the present disclosure will be described with reference to the drawings. Note that descriptions will be made in the following order.

1. Regarding Configuration Example of Communication System
2. Regarding Outline of Caption Data
3. Regarding Problems Caused when TTML Caption Data Files Are Switched
4. Regarding Embodiment for Eliminating Interruption of Caption
5. Regarding Sequence of Caption Display Control
6. Regarding Configuration Examples of Transmission Apparatus and Reception Apparatus
7. Summary of Configuration of Present Disclosure 1. Regarding Configuration Example of Communication System A configuration example of a communication system for performing processing according to the present disclosure will be described first with reference to FIG. 1.

Figure 1:
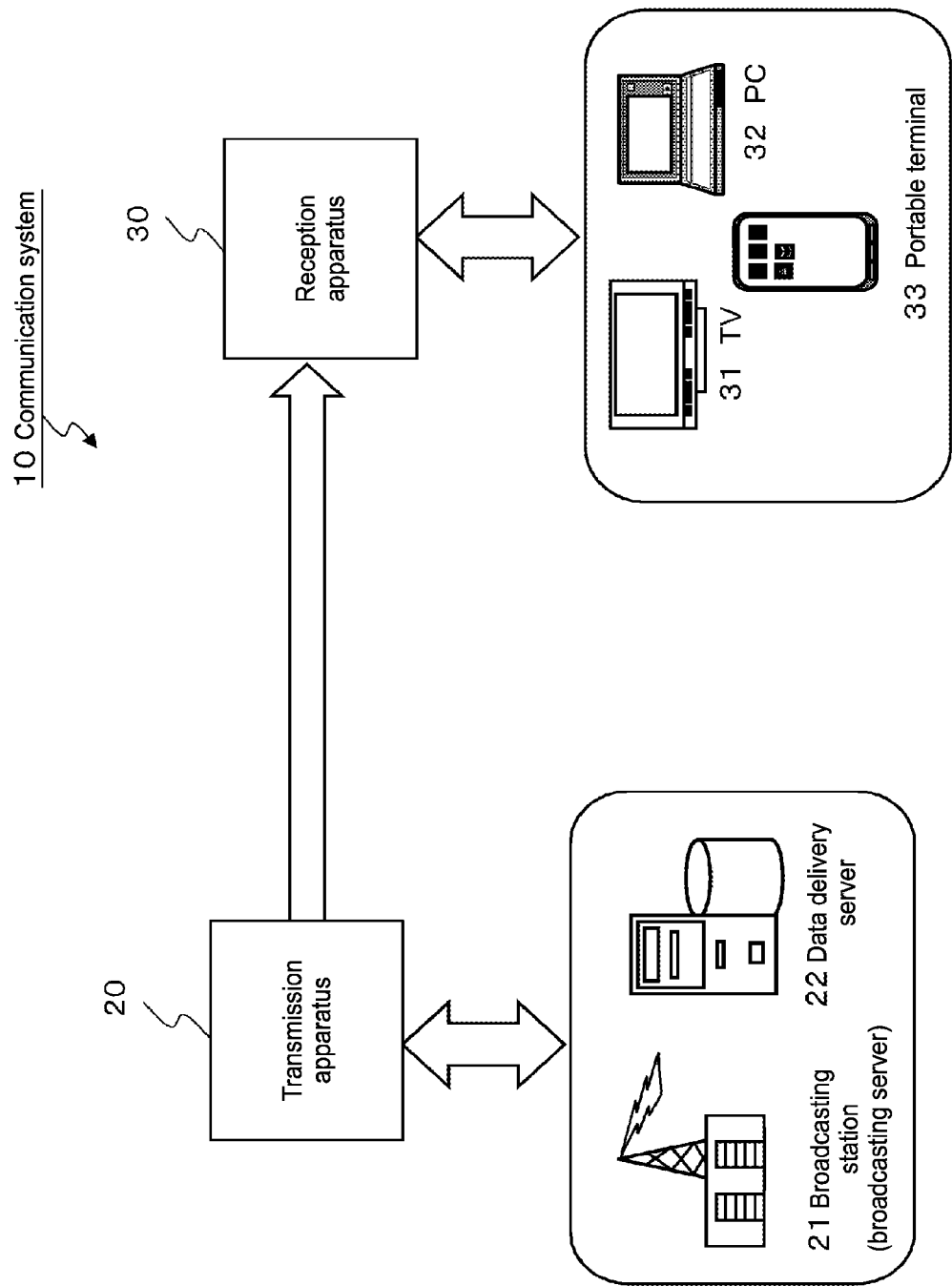
FIG. 1 A diagram explaining a configuration example of a communication system for performing processing according to the present disclosure.

As shown in FIG. 1, a communication system 10 includes a transmission apparatus 20 that transmits image data, audio data, caption data, and data such as various kinds of control information, and a reception apparatus 30 that receives the data transmitted from the transmission apparatus 20.

The transmission apparatus 20 is specifically an apparatus that provides content, such as a broadcasting station 21 and a content server 22.

On the other hand, the reception apparatus 30 is a client apparatus of a general user, and is specifically constituted of a television 31, a PC 32, a portable terminal 33, or the like.

The data communication performed between the transmission apparatus 20 and the reception apparatus 30 uses any or both of bidirectional communication or unidirectional communication via a network such as the Internet and unidirectional communication through a broadcast wave or the like.

The data transmission from the transmission apparatus 20 to the reception apparatus 30 is performed in various formats such as MPEG-2TS, MP4, and MMT (MPEG Media Transport). Note that in the case where the processing according to the present disclosure is performed, the data delivery format is not limited.

In any of the MPEG-2TS, MP4, and MMT formats, encoded data being data constituting content such as an image (Video), audio, and captions, and the format for transmitting the control information thereof are specified.

The transmission apparatus 20 encodes content data, generates a data file including the encoded data and metadata of the encoded data, stores the generated encoded data in a packet, and transmits it through a broadcast wave or via a network.

The data provided from the transmission apparatus 20 to the reception apparatus 30 includes guide information such as program guide, notification information, and control information, as well as reproduction target data such as an image, audio, and captions.

An example of the data transmitted from the transmission apparatus 20 will be described with reference to FIG. 2.

Figure 2:
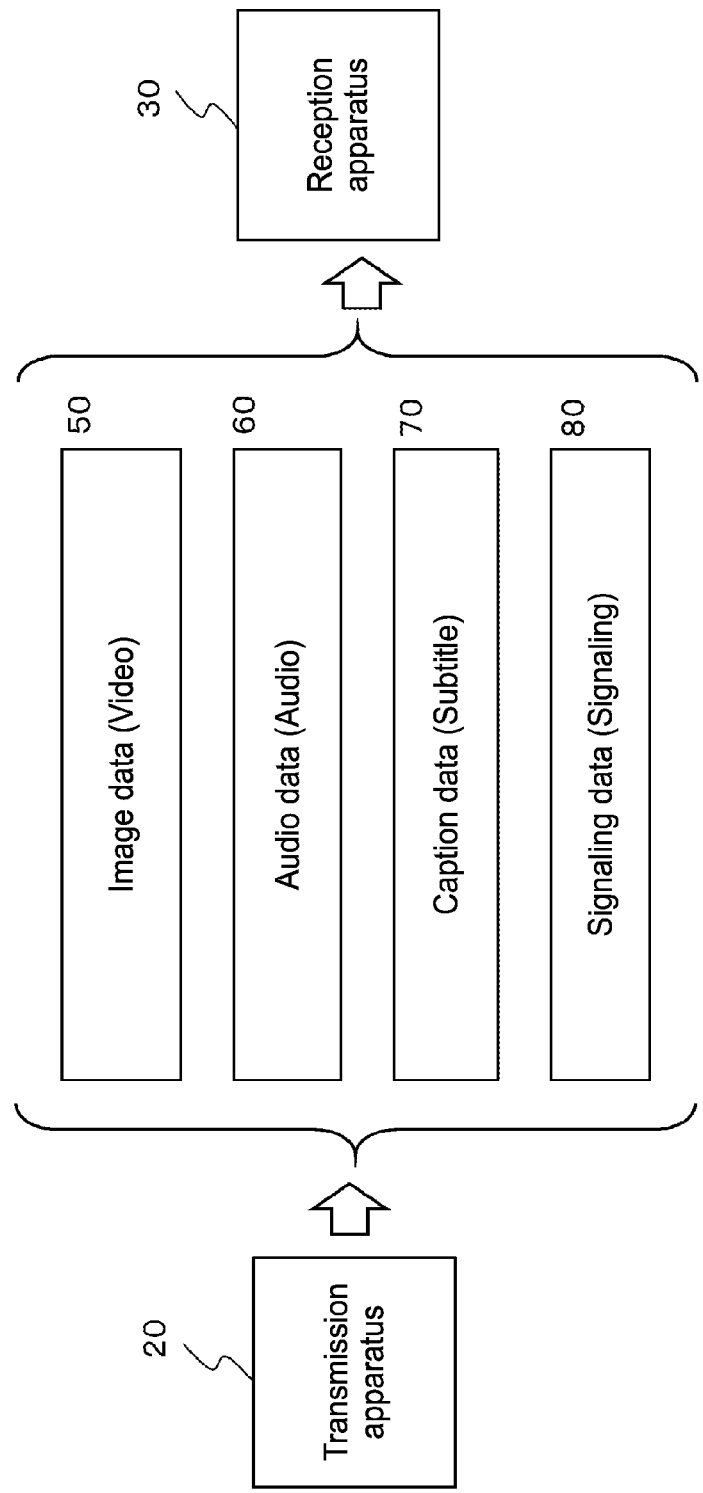
FIG. 2 A diagram explaining transmission data transmitted by a transmission apparatus.

In FIG. 2, the kind of data transmitted from the transmission apparatus 20 to the reception apparatus 30 is shown. The data transmitted from the transmission apparatus 20 to the reception apparatus 30 includes the following data:

(a) Image data (Video) 50;
(b) Audio data (Audio) 60;
(c) Caption data (Subtitle) 70; and
(d) Signaling data 80.

These pieces of data are transmitted as a payload of the packet specified in a communication format.

Note that the signaling data is notification information or control information for the reception apparatus 30, and includes, for example, setting information, data attribute information, and control information. The setting information is necessary for receiving, decoding, and reproducing the image data, audio data and caption data.

2. Regarding Outline of Caption Data

In the configuration of the present disclosure, the TTML (Timed Text Markup Language) is used. In the TTML, the caption data in the XML (Extensible Markup Language) format is used, and the display area or display timing can be controlled.

An example of the caption display control using the TTML caption data will be described.

Figure 3:
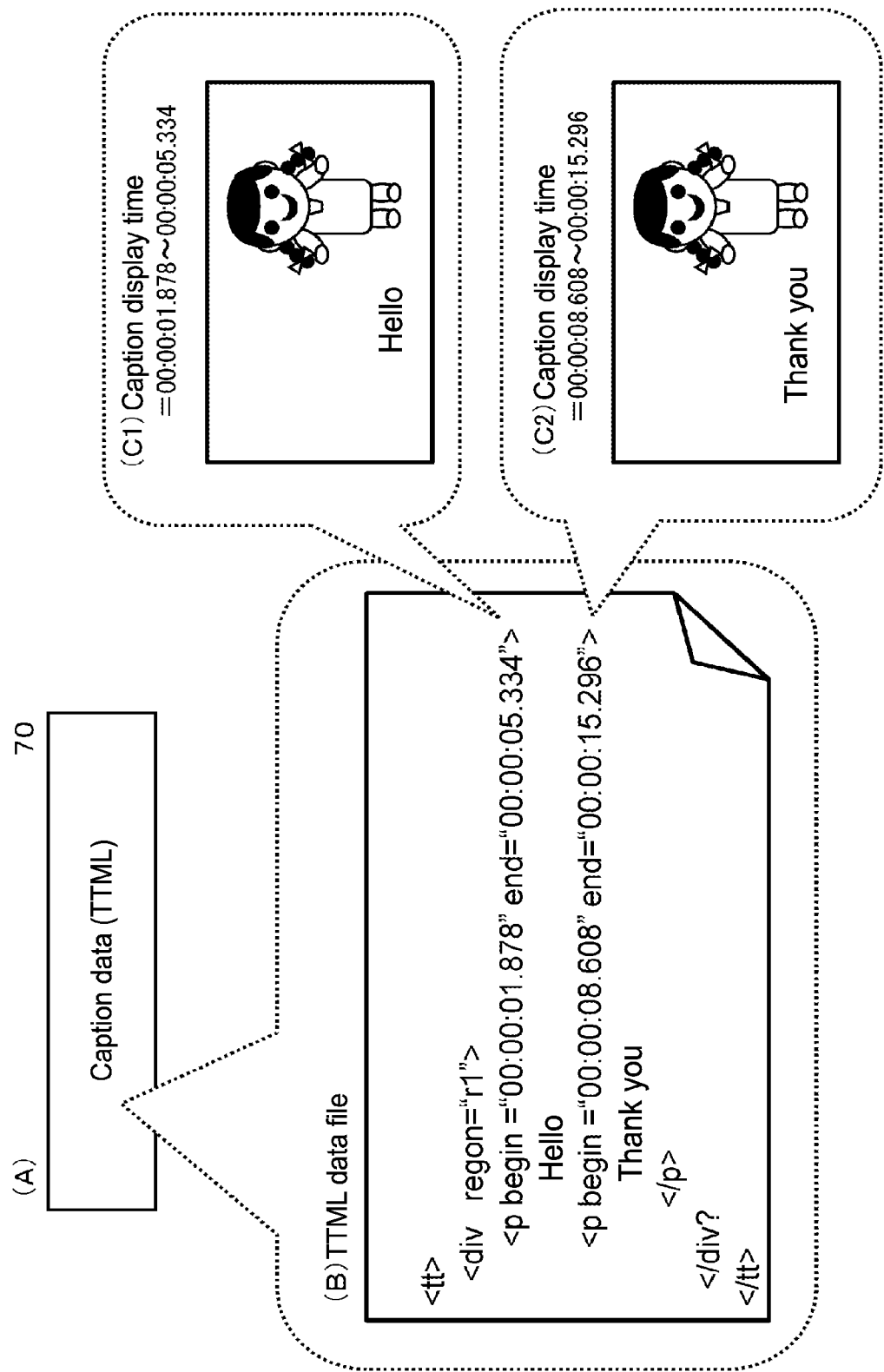
FIG. 3 A diagram explaining the caption display processing using the TTML caption data.

FIG. 3 is a diagram showing a configuration example of the TTML caption data in the XML format stored in caption data (Subtitle) 70 transmitted from the transmission apparatus 20 to the reception apparatus 30, and an example of caption display performed in the reception apparatus 30 using the TTML caption data.

In the (A) the caption data (Subtitle) 70 transmitted from the transmission apparatus 20 to the reception apparatus 30, for example, the TTML caption data shown in the (B) part of FIG. 3 is stored.

The TTML caption data is, for example, data in the XML format shown in the (B) part of FIG. 3, and has a configuration in which information on display area, display timing, or the like can be described in addition to the text string, which is actually displayed.

The reception apparatus 30 performs processing of interpreting such TTML caption data, generate the display data as shown in the (C) part of FIG. 3, i.e., display data obtained by superimposing captions on image data, which is acquired from another packet and is decoded, and display it on a display unit.

In the TTML caption data shown in the (B) part of FIG. 3, the following information:

```
<div  regon="r1">
  <p begin ="00:00:01.878" end="00:00:05.334">
    Hello
  <p begin ="00:00:08.608" end="00:00:15.296">
    Thank you
  </p>
</div?
is stored.
```

With this TTML data, it is possible to achieve control of displaying the caption data, two text strings of "Hello" and "Thank you," in an area at a time specified therefor.

<div regon="r1"> represents control information for displaying the caption in a particular display area [r1] of the display screen.

<p begin="00:00:01.878" end="00:00:05.334"> represents control information that specifies a display start time and a display end time for the caption data, "Hello."

It is control information for displaying the caption data, "Hello," at the display start time of 00 hour 00 minute 01 second 878 and the display end time of 00 hour 00 minute 05 second 334.

Note that the time can be measured on the basis of a system clock of the reception apparatus 30.

<p begin="00:00:08.608" end="00:00:15.296"> represents control information that specifies a display start time and a display end time for the caption data, "Thank you."

It is control information for displaying the caption data, "Thank you," at the display start time of 00 hour 00 minute 08 second 608 and the display end time of 00 hour 00 minute 15 second 296.

Specifically, this TTML caption data includes control information for performing the following caption display.

The caption, "Hello," is displayed in the display area [r1] from the time of 0 hour 00 minute 01 second 878 to the time of 00 hour 00 minute 05 second 334.

Thereafter, the caption, "Thank you," is displayed in the display area [r1] from the time of 0 hour 00 minute 08 second 608 to the time of 00 hour 00 minute 15 second 296.

The control information is for performing the above-mentioned caption display.

The display results based on this TTML data are shown as display data of the (C1) and (C2) parts of FIG. 3.

The caption data is superimposed on the image data for which the display time is specified, and is displayed.

The (C1) part of FIG. 3 represents an example of the display image obtained by superimposing the caption, "Hello," on the image, and corresponds to the display data displayed from the time of 0 hour 00 minute 01 second 878 to the time of 00 hour 00 minute 05 second 334.

The (C2) part of FIG. 3 is the display data displayed after the display data of (C1) part of FIG. 3, and represents an example of the display image obtained by superimposing the caption, "Thank you," on the image. It corresponds to the display data displayed from the time of 0 hour 00 minute 08 second 608 to the time of 00 hour 00 minute 15 second 296.

In FIG. 3, an example of the TTML caption data using an attribute (begin) that represents the display start time of the caption data, and an attribute (end) that represents the display end time is shown. In addition thereto, there exists TTML caption data using an attribute (begin) that represents the display start time of the caption data and an attribute (dur) that represents the display time period (duration), for example, as shown in FIG. 4.

Figure 4:
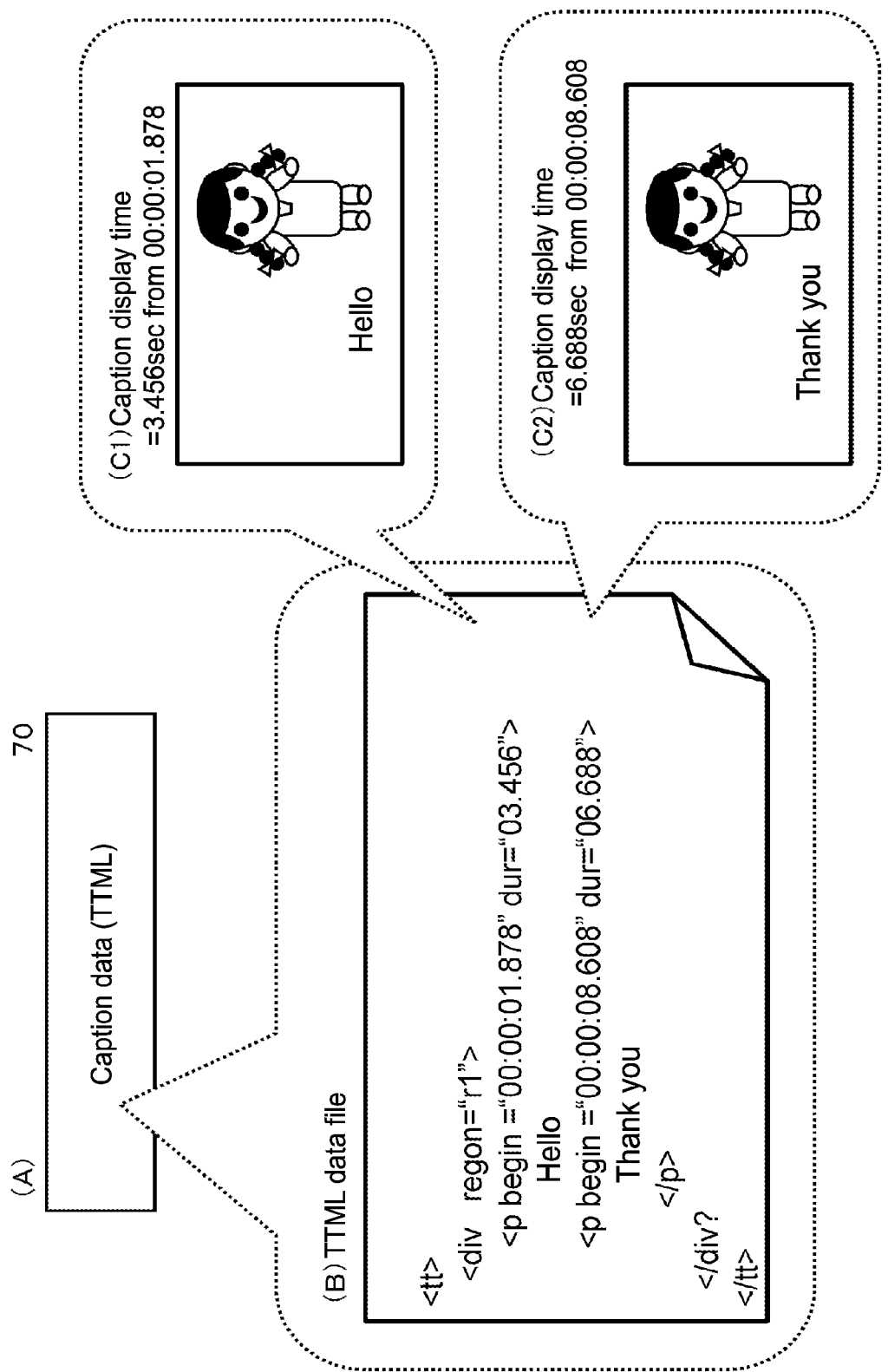
FIG. 4 A diagram explaining the caption display processing using the TTML caption data.

In the TTML caption data shown in the (B) part of FIG. 4, the following information:

```
<div  regon="r1">
  <p begin ="00:00:01.878" dur="03.456">
    Hello
  <p begin ="00:00:08.608" dur="06.668">
    Thank you
  </p>
</div?
is stored.
```

Also with this TTML data, it is possible to achieve control of displaying the caption data, two text strings of "Hello" and "Thank you," at a time specified therefor, similarly to the example shown in FIG. 3.

<div regon="r1"> represents control information for displaying the caption in the particular display area [r1] of the display screen.

<p begin="00:00:01.878" dur="03.456"> represents control information that specifies a display start time and a display time period for the caption data, "Hello."

It is control information for displaying the caption data, "Hello," at the display start time of 00 hour 00 minute 01 second 878 for the display time period of 03 seconds 456.

Note that the time can be measured on the basis of a system clock of the reception apparatus 30.

<ID begin="00:00:08.608" dur="06.668"> represents control information that specifies a display start time and a display time period for the caption data, "Thank you."

It is control information for displaying the caption data, "Thank you," at the display start time of 00 hour 00 minute 08 second 608 for the display time period of 06 seconds 688.

Specifically, this TTML caption data includes control information for performing the following caption display.

The caption, "Hello," is displayed in the display area [r1] from the time of 0 hour 00 minute 01 second 878 for 03 seconds 456.

Thereafter, the caption, "Thank you," is displayed in the display area [r1] from the time of 0 hour 00 minute 08 second 608 for 06 seconds 688.

The control information is for performing the above-mentioned caption display.

The display results based on this TTML data are shown as display data of the (C1) and (C2) parts of FIG. 4.

The caption data is superimposed on the image data for which the display time is specified, and is displayed.

The (C1) part of FIG. 4 represents an example of the display image obtained by superimposing the caption, "Hello," on the image, and corresponds to the display data displayed from the time of 0 hour 00 minute 01 second 878 for 03 seconds 456.

The (C2) part of FIG. 4 is the display data displayed after the display data of (C1) part of FIG. 4, and represents an example of the display image obtained by superimposing the caption, "Thank you," on the image. It corresponds to the display data displayed from the time of 0 hour 00 minute 08 second 608 for 06 seconds 688.

As described above with reference to FIGS. 3 and 4, the TTML caption data is generated as data including a text string to be the caption data and control information on display timing, display area, or the like of the text string.

Note that it is possible to set various kinds of control information in addition to those described in FIGS. 3 and 4.

3. Regarding Problems Caused when TTML Caption Data Files are Switched

As described above with reference to FIGS. 3 and 4, the TTML caption data includes a text string to be the caption data and control information on display timing, display area, or the like of the text string.

However, when the processing using display timing control information included in the TTML data is performed, the displayed text string may disappear, i.e., the caption interruption may occur when the TTML data files are switched.

This problem will be described with reference to FIG. 5.

Figure 5:
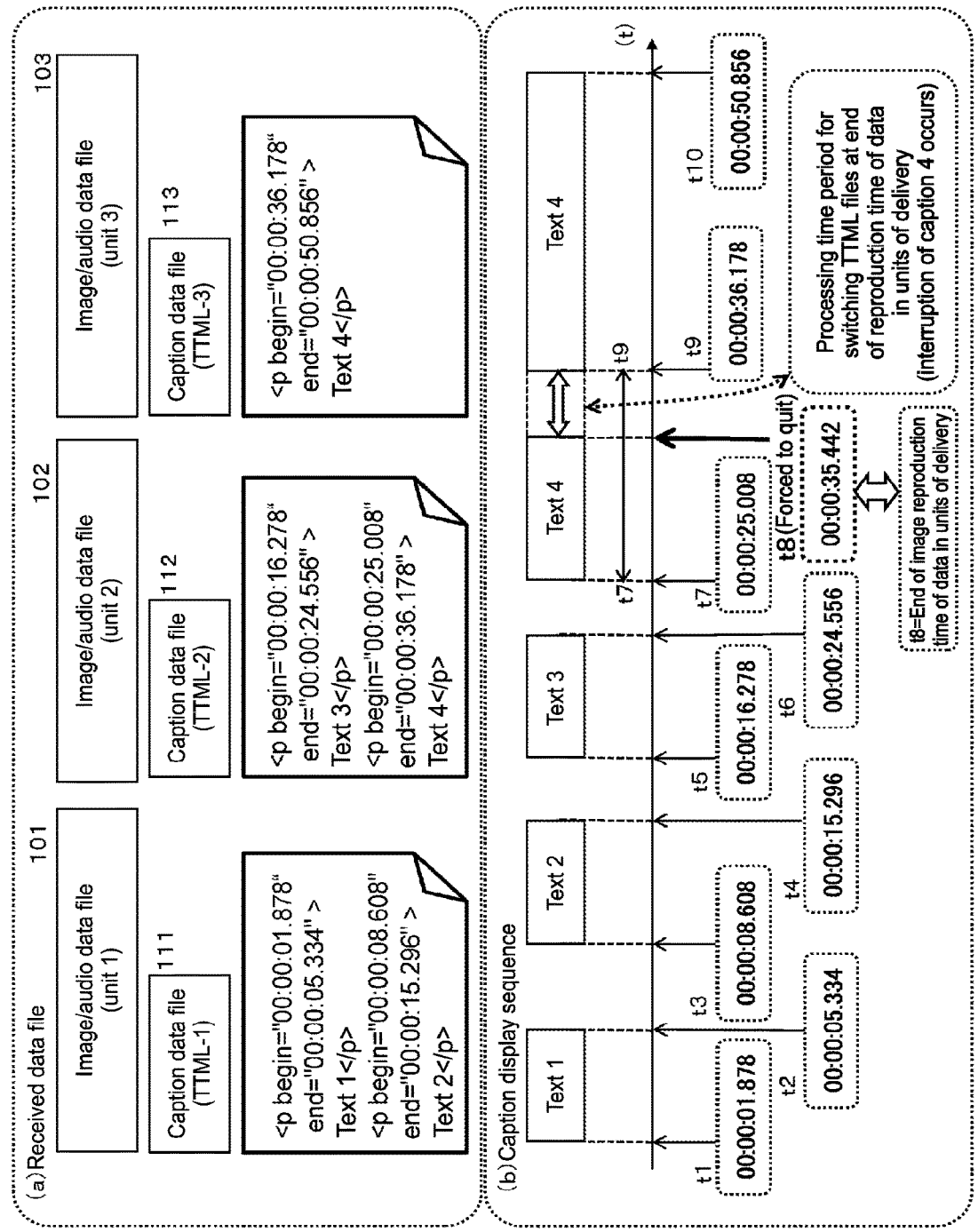
FIG. 5 A diagram explaining caption Interruption occurred in the caption display processing using the TTML caption data.

FIG. 5 shows the following two pieces of information:

(a) data file sequentially received by the reception apparatus 30 from the transmission apparatus 20; and (b) caption data display sequence performed by the reception apparatus 30.

As shown by the time axis (t) in the (b) part of FIG. 5, time increases from left to right.

In the example shown in FIG. 5, a processing example in the case where the reception apparatus 30 receives, from the transmission apparatus 20, image/audio data files 101 to 103 and three TTML caption data files (TTML-1 to 3) 111 to 113 for performing processing synchronized with these data files is shown. The reception apparatus 30 uses the received three caption data files 111 to 113 to perform the caption display processing.

Note that the image/audio data files 101 to 103 are each a data file in units of transfer or processing defined in, for example, a data transfer method such as MPEG-2TS, MP4, and MMT.

In the case where the data communication format is MP4, for example, the image/audio data files 101 to 103 each correspond to the encoded data file "mdat" defined as units of processing in MP4.

On the other hand, in the case where the data communication format is MMT, the image/audio data files 101 to 103 each correspond to the encoded data file "MFU" defined as units of processing in MMT.

In these data files, an image and audio reproduced for a predetermined time period are stored. Note that although each of the image/audio data files 101 to 103 is shown as one file in FIG. 5, the image file and the audio file are transferred as an individual file in some cases.

In the image/audio data files 101 to 103, data for reproduction is stored to prevent interruption of data in a processing time period from occurring, taking into account the processing time period when files are switched.

On the other hand, the caption data files 111 to 113 are each TTML caption data similar to those described above with reference to FIGS. 3 and 4.

For each of the caption data files 111 to 113, a time stamp is set to perform processing synchronized with the image/audio data files 101 to 103.

The reception apparatus 30 is capable of performing control of synchronizing the image, audio, and captions with each other by performing processing referring to the time stamp.

By referring to the time stamp, it is possible to determine which of the caption data files 111 to 113 is associated with any of the image/audio data files 101 to 103 for performing processing.

As shown in the (a) part of FIG. 5, in the TTML caption data file (TTML-1) 111, the following caption display control data:

the display start time (begin) of 00:00:01.878, and the display end time (end) of 00:00:05.334 regarding a text string (text 1); and the display start time (begin) of 00:00:08.608, and the display end time (end) of 00:00:15.296 regarding a text string (text 2) is stored.

As shown in the (b) part of FIG. 5, a caption data processing unit of the reception apparatus 30 uses the TTML caption data file (TTML-1) 111 to perform caption display of the text string 1 and the text string 2.

Specifically, display of the text string 1 is started at a time t1 of 00:00:01.878 and finished at a time t2 of 00:00:05.334.

Further, display of the text string 2 is started at a time t3 of 00:00:08.608 and finished at a time t4 of 00:00:15.296.

In the next TTML caption data file (TTML-2) 112, the following caption display control data:

the display start time of 00:00:16.278, and the display end time of 00:00:24.556 regarding a text string (text 3); and the display start time of 00:00:25.008, and the display end time of 00:00:36.178 regarding a text string (text 4) is stored.

The caption data processing unit of the reception apparatus 30 switches processing targets to the TTML caption data file (TTML-2) 112 after the display processing of the TTML caption data file (TTML-1) 111, and uses the TTML caption data file (TTML-2) 112 to perform caption display of the text string 3 and the text string 4 as shown in the (b) part of FIG. 5.

Specifically, display of the text string 3 is started at a time t5 of 00:00:16.278 and finished at a time t6 of 00:00:24.556.

Further, display of the text string 4 is started at a time t7 of 00:00:25.008.

However, a time t9 of 00:00:36.178 being the display end time of the text string 4 is set to be later than the image reproduction end time (t8=00:00:35.442) of the synchronization processing data file associated with the TTML caption data file (TTML-2) 112, i.e., the image/audio data file 102.

In the example shown in the figure, the image reproduction end time of the image/audio data file 102 is the t8 of 00:00:35.442.

The reception apparatus 30 switches processing to the next image/audio data file 103 when the reproduction end time (t8=00:00:35.442) of the image/audio data file 102 being the main data has come. During the file switching, the reception apparatus 30 switches also caption data files.

Interruption of the image/audio data does not occur because reproduction data taking into account the processing time period for the file switching is stored in the previous file to prevent data interruption from occurring.

However, the TTML caption data only includes control information serving as the display start time and the display end time or the display time period, and does not take into account the data continuity through file switching of image data or the like.

The caption data processing unit of the reception apparatus 30 stops, when the TTML caption data files are switched, display of the caption data currently displayed. Specifically, the caption data processing unit deletes the caption data for display from the memory that stores the data, stops the caption display, and processes the next TTML caption data.

As a result, the display of the caption (text 4) of the TTML caption data file (TTML-2) 112 shown in FIG. 5 is interrupted.

Specifically, the caption data processing unit switches caption data files together with image/audio data files, and performs, when the file switching processing is performed, processing of deleting the display text data from the memory and stop the display.

As described above, in the case where the display end time of the caption (text 4) of the TTML caption data file (TTML-2) 112 is set to be later than the reproduction end time of the image/audio data file 102 being the main data, the file switching forces display of the display text data to quit and thus, the text display disappears.

Specifically, during the time period from the t8 to the time t9 shown in the (B) part of FIG. 5, caption interruption display occurs.

The state where interruption of text display occurs in the example shown in FIG. 5 will be described in detail.

The time t8=00:00.35.442 shown in the (b) part of FIG. 5 corresponds to the reproduction end time of the image/audio data file 102 being the main data.

In the TTML caption data file (TTML-2) 112, the following display timing control information the display start time of 00:00:25.008, and the display end time of 00:00:36.178 regarding the text string 4 is stored.

The display end time=00:00:36.178 of the text string 4 is set to be later than the reproduction end time (t8=00:00:35.442) of the image/audio data file 102 being the main data, which is set as a synchronization reproduction target with the TTML-2.

As described above, even when the display end time stored in the TTML caption data is set to be later than the reproduction end time of the image/audio data file being the main data, the caption data processing unit of the reception apparatus 30 switches caption data files in synchronization with the image/audio data file switching. This file switching causes caption interruption display to occur during the time period from the time t8 to the time t9 shown in the (B) part of FIG. 5.

Thereafter, the caption data processing unit of the reception apparatus 30 starts processing for the next caption data file (TTML-3) 113.

In the next TTML caption data file (TTML-3) 113, the following caption display control data the display start time of 00:00:36.178, and the display end time of 00:00:50.856 regarding the text string (text 4) is stored.

As shown in the (b) part of FIG. 5, in accordance with this display control information, the caption data processing unit of the reception apparatus 30 starts display of the text string 4 at the time t9 of 00:00:36.178 and finishes the display at a time t10 of 00:00:50.856.

The control information on the caption data file (TTML-2) 112 and the caption data file (TTML-3) 113 is originally the following information: control information for continuously displaying the text string (text 4) during the time period from the display start time (t7) to the display end time (t10).

However, by switching the caption data files at the reproduction end time (t8=00:00:35.442) of the image/audio data file 102 being the synchronization processing data file, the above-mentioned caption interruption occurs during the time period from the time t8 to the time t9.

Note that it is possible not to record a value (time information) in the attribute (end) of the caption display end time in the TTML caption data. In the case where a value (time information) is not recorded in the attribute (end), caption display is performed on the caption until the processing end time of the caption data file.

Figure 6:
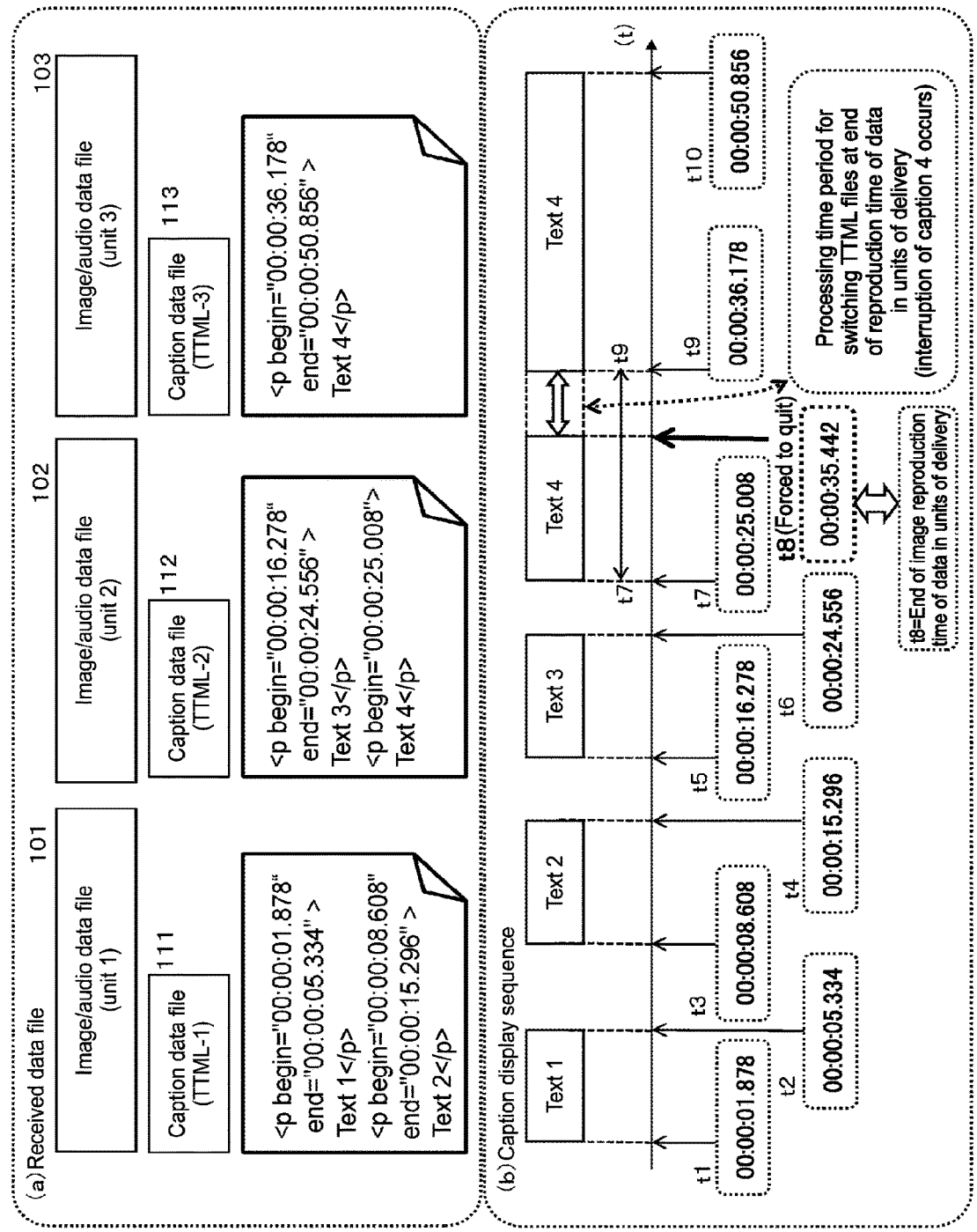
FIG. 6 A diagram explaining caption interruption occurred in the caption display processing using the TTML caption data.

Specifically, it is setting shown in the caption data file (TTML-2) 112 in FIG. 6.

The caption data file (TTML-2) 112 shown in FIG. 6 includes the following information:

<p begin="00:00:16.278"
end="00:00:24.556" >
text 3</p>
<p begin="00:00:25.008">
text 4</p>.

The above-mentioned caption data file (TTML-2) 112 includes the following information:

the display start time of 00:00:16.278, and the display end time of 00:00:24.556 regarding the text string (text 3); and the display start time of 00:00:25.008 regarding the text string (text 4).

The display end time is not recorded for the text string (text 4). In this case, the caption data processing unit that performs the caption display control performs caption display on the text string (text 4) until the processing end time of the caption data file.

In this case, however, the processing end time of the caption data file (TTML2) 112 is the image reproduction end time (t8=00:00:35.442) of the image/audio file 102 being the synchronization processing data. At this point, the TTML caption data files are switched. After all, the display of the text string (text 4) is interrupted during the file switching processing.

As described above with reference to FIG. 4, it is possible to use the attribute (dur) that represents the display time period (duration) instead of the attribute (end) of the caption display end time in the TTML caption data.

Figure 7:
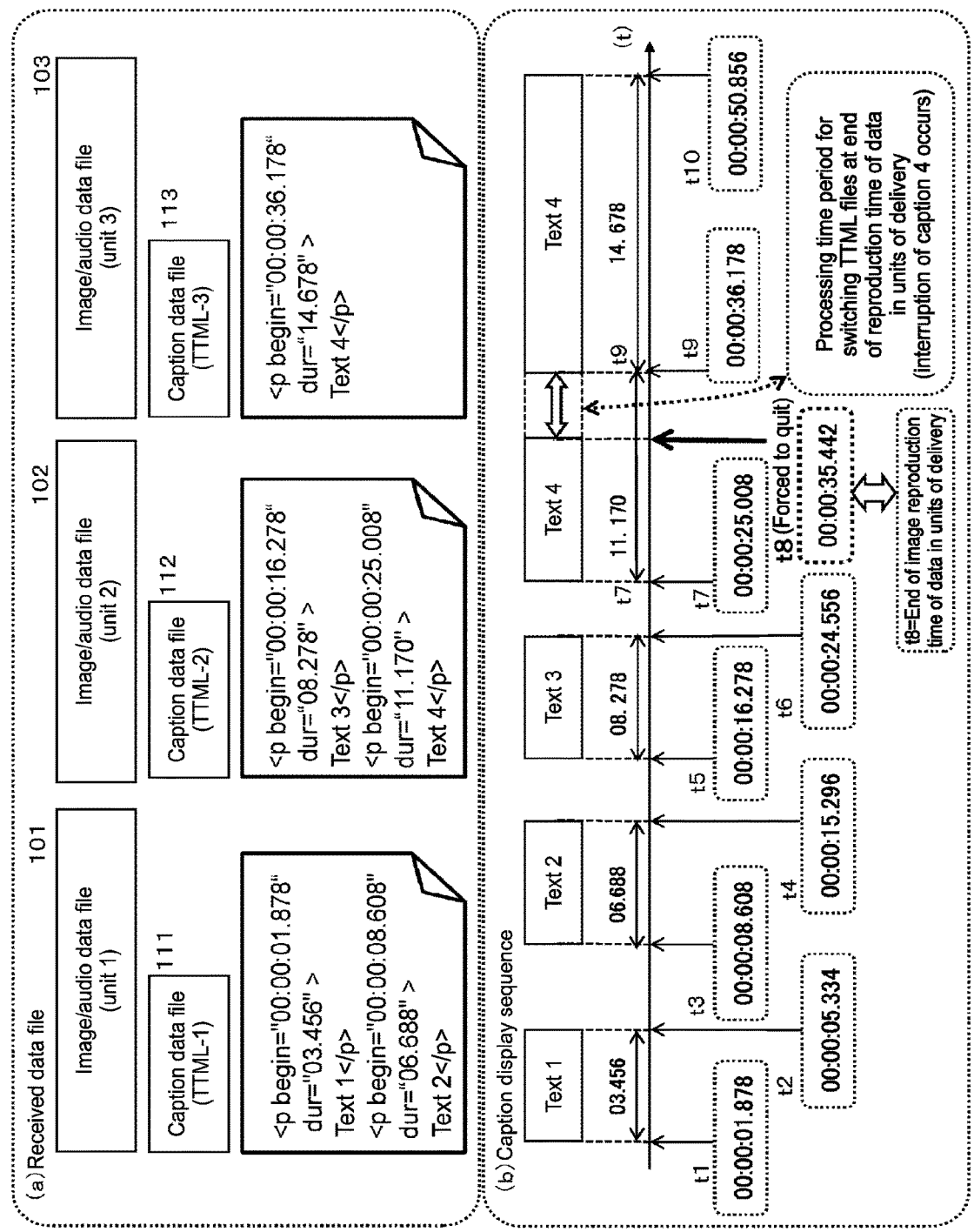
FIG. 7 A diagram explaining caption interruption occurred in the caption display processing using the TTML caption data.

An example using the attribute (dur) that represents the display time period (duration) is shown in FIG. 7.

The caption data file (TTML-2) 112 shown in FIG. 7 includes the following information:

```
<p begin="00:00:16.278"
    dur="08.278">
text 3</p>
<p begin="00:00:25.008"
    dur="11.170">
text 4</p>.
```

The above-mentioned caption data file (TTML-2) 112 includes the following information:
  the display start time of 00:00:16.278, and
  the display time period of 08.278 seconds regarding the text string (text 3); and
  the display start time of 00:00:25.008, and
  the display time period of 11.170 seconds regarding the text string (text 4).

Also in this case, however, display interruption of the text string (text 4) occurs when the caption data files are switched similarly to the case described with reference to FIGS. 5 and 6.

In accordance with the control information on the caption data file (TTML-2) 112, display of the text string 4 is started at the display start time of 00:00:25.008.

The time when the display time period of 11.170 seconds is finished is the time t9=00:00:36.178 shown in the (b) part of FIG. 7.

The time t9 is set to be later than the reproduction end time (t8=00:00:35.442) of the image/audio data file 102 being the main data, which is set as a synchronization reproduction target with the TTML-2.

As described above, even when the display end time recorded in the TTML caption data is set to be later than the reproduction end time of the image/audio data file being the main data, the caption data processing unit of the reception apparatus 30 switches caption data files in synchronization with the image/audio data file switching. This file switching causes caption interruption display to occur during the time period from the time t8 to the time t9 shown in the (b) part of FIG. 7.

As described above, caption interruption occurs regardless of the kind of control information recorded in the TTML caption data.

4. Regarding Embodiment for Eliminating Interruption of Caption

In the following, an embodiment for solving the above-mentioned problem of caption interruption will be described.

Figure 8:
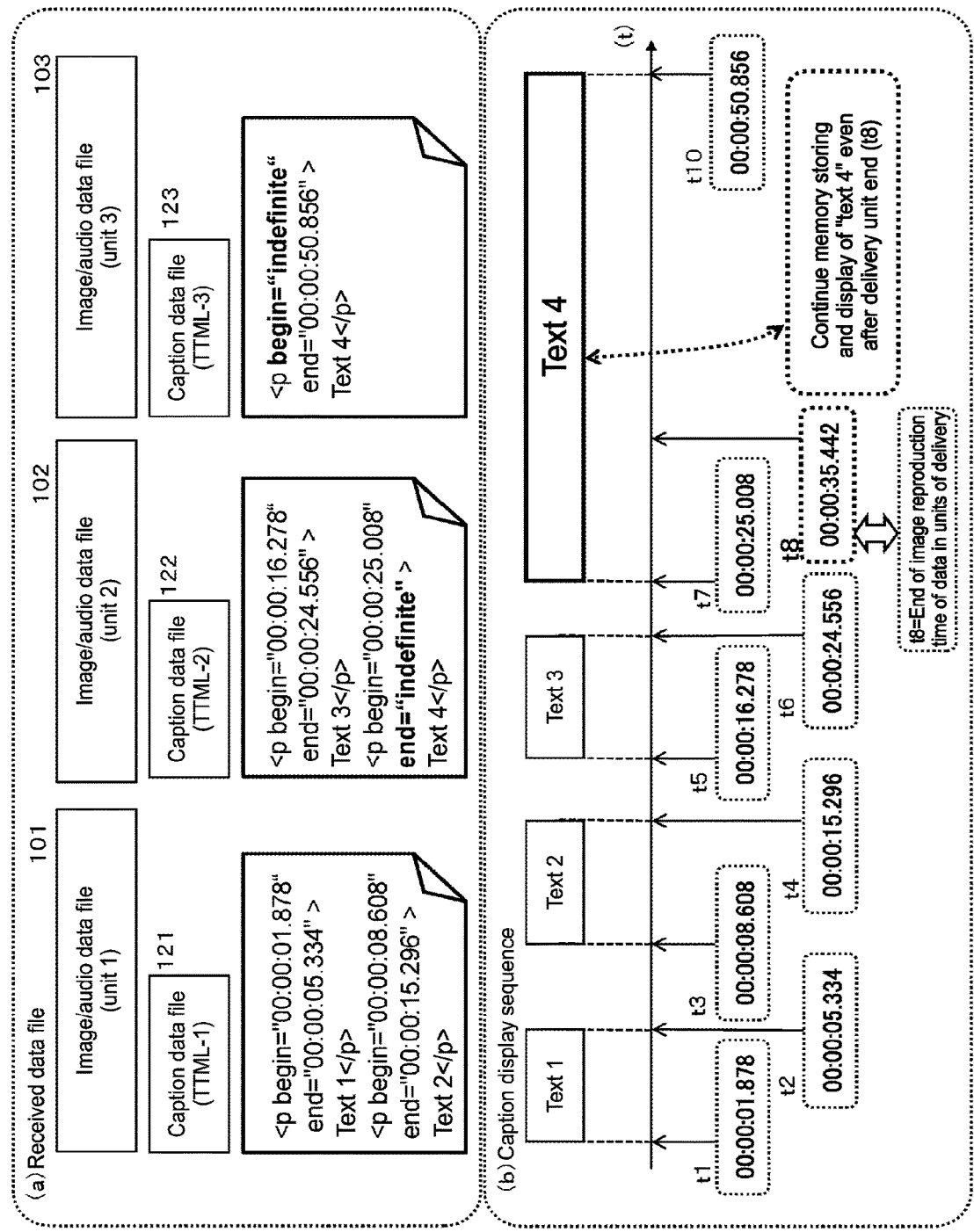
FIG. 8 A diagram explaining the caption display control processing using the TTML caption data in which the caption interruption is prevented from occurring.

FIG. 8 is a diagram showing a processing example in the reception apparatus 30.

Similarly to the processing examples described with reference to FIGS. 5 to 7, FIG. 8 shows the following two pieces of information:
  (a) data file sequentially received by the reception apparatus 30 from the transmission apparatus 20; and
  (b) caption data display sequence performed by the reception apparatus 30.

As shown by the time axis (t) in the (b) part of FIG. 8, time increases from left to right.

In the example shown in FIG. 8, a processing example in the case where the reception apparatus 30 receives, from the transmission apparatus 20, the image/audio data files 101 to 103 and three TTML caption data files (TTML-1 to 3) 121 to 123 for performing processing synchronized with these data files is shown. The reception apparatus 30 uses the received three caption data files 121 to 123 to perform the caption display processing.

Note that the image/audio data files 101 to 103 are each a data file in units of transfer or processing defined in, for example, a data transfer method such as MPEG-2TS, MP4, and MMT.

In the case where the data communication format is MP4, for example, the image/audio data files 101 to 103 each correspond to the encoded data file "mdat" defined as units of processing in MP4.

On the other hand, in the case where the data communication format is MMT, the image/audio data files 101 to 103 each correspond to the encoded data file "MFU" defined as units of processing in MMT.

In these data files, an image and audio reproduced for a predetermined time period are stored. Note that although each of the image/audio data files 101 to 103 is shown as one file in the figure, the image data file and the audio data file may be set as an individual data file.

In the image/audio data files 101 to 103, data for reproduction is stored to prevent interruption of data during the file switching time period from occurring, taking into account the processing time period when files are switched.

On the other hand, the caption data files 121 to 123 are each TTML caption data similar to those described above with reference to FIGS. 3 and 4.

For each of the caption data files 121 to 123, a time stamp is set to perform processing synchronized with the image/audio data files 101 to 103.

The reception apparatus 30 is capable of synchronizing the image data, audio data, and caption data with each other and outputting it by performing processing referring to the time stamp of each data file of the image, audio, and captions. By referring to the time stamp, the reception apparatus 30 is capable of determining which of the caption data files 121 to 123 is associated with any of the image/audio data files 101 to 103 for performing processing.

As shown in the (a) part of FIG. 8, in the TTML caption data file (TTML-1) 121, the following caption display control data:
  the display start time of 00:00:01.878, and
  the display end time of 00:00:05.334 regarding the text string (text 1); and
  the display start time of 00:00:08.608, and
  the display end time of 00:00:15.296 regarding the text string (text 2) is stored.

This is the control information similar to the TTML caption data file (TTML-1) 111 described above with reference to FIG. 5.

As shown in the (b) part of FIG. 8, the caption data processing unit of the reception apparatus 30 uses the TTML caption data file (TTML-1) 121 to perform caption display of the text string 1 and the text string 2.

Specifically, the display of the text string 1 is started at the time 1 of 00:00:01.878 and finished at the time t2 of 00:00:05.334.

Further, the display of the text string 2 is started at the time t3 of 00:00:08.608 and finished at the time t4 of 00:00:15.296.

In the next TTML caption data file (TTML-2) 122, the following data:

```
<p begin="00:00:16.278"
    end="00:00:24.556" >
text 3</p>
```

```
    <p begin="00:00:25.008"
        end="indefinite" >
    text 4</p>
is stored.
```

This data represents that:

the display start time is 00:00:16.278, and the display end time is 00:00:24.556 regarding the text string (text 3); and the display start time is 00:00:25.008, and the display end time is the continuous display instruction value (indefinite) regarding the text string (text 4).

This data is different from the TTML caption data file (TTML-2) 112 described above with reference to FIG. 5 in that the display end time of the text string (text 4) is not determined (indefinite). This display end time being the continuous display instruction value (indefinite) represents control information for switching files while continuing display of the text being a display target.

The image/audio data processing unit of the reception apparatus 30 switches processing to the next image/audio data file 103 when the reproduction end time (t8=00:00:35.442) of the image/audio data file 102 being the main data, which is set as a synchronization processing target with the TTML caption data file (TTML-2) 122, has come.

On the other hand, in the case where the display end time is set to the continuous display instruction value (indefinite) as control information relating to the text currently displayed on the basis of the TTML caption data being a processing target, the caption data processing unit continues the text display using the data stored in the memory without deleting the text string in the memory, which stores the displayed text string on the display unit. The caption data processing unit switches files in parallel with the text display continuing processing.

In the example shown in FIG. 8, similarly to the examples described above with reference to FIGS. 5 to 7, the reproduction end time (t8=00:00:35.442) of the image/audio data file 102 being the main data, which is set as a synchronization processing target with the TTML caption data file (TTML-2) 122, comes while the text string (text 4) of the TTML caption data file (TTML-2) 122 is displayed.

The caption data processing unit performs the following processing on the basis of confirmation of the text display end time of the text string (text 4) of the TTML caption data file (TTML-2) 122 being set to the continuous display instruction value (indefinite).

The caption data processing unit continues the text display using the data (text 4) stored in the memory without deleting the text string in the memory, which stores the displayed text string (text 4) on the display unit.

Further, the caption data processing unit switches files, i.e., performs file switching from the TTML caption data file (TTML-2) 122 to the TTML caption data file (TTML-3) 123 in parallel, while continuing the text display.

The next TTML caption data file (TTML-3) 123 includes the following information:

```
    <p begin="indefinite8"
        end="00:00:50.856" >
    text 4</p>.
```

This data represents that regarding the text string (text 4):

the display start time is the continuous display instruction value (indefinite); and the display end time is 00:00:50.856.

At the time of the file switching, the caption data processing unit of the reception apparatus 30 continues the memory storing and display of the text data (text 4) in accordance with control information (display end time of the text string (text 4) being the continuous display instruction value (indefinite)) on the TTML caption data file (TTML-2) 122 being the previous processing file.

The caption data processing unit switches the processing target file to the TTML caption data file (TTML-3) 123, and detects, from the TTML caption data file (TTML-3) 123 after the switching, the following control information of the text string (text 4):

the display start time of the continuous display instruction value (indefinite); and the display end time of 00:00:50.856.

The caption data processing unit confirms that the text display start time of the text string (text 4) of the TTML caption data file (TTML-3) 123 is set to the continuous display instruction value (indefinite).

On the basis of this confirmation, the caption data processing unit determines whether or not (a) text string (text 4) for which the display start time is set to the continuous display instruction value (indefinite) and (b) text string that is stored in the memory and is continuously displayed match.

In the case where the (a) text string and the (b) text string match, the text string currently displayed is stored in the memory as it is, and display of the text string is continued.

It should be noted that the text display control processing is performed on the basis of the file after the file switching, i.e., the TTML caption data (TTML-3) 123.

By this processing target file switching, display of the text string (text 4) is continued until the display end time of t10 being 00:00:50.856 recorded in the TTML caption data file (TTML-3) 123, and finished at the time t10.

By performing such processing, as shown in the (b) part of FIG. 8, the text string (text 4) is continuously displayed without interruption during the file switching.

Note that the above-mentioned (a) and (b) do not match in some cases.

For example, the reception apparatus that receives a program (content) in the middle receives the caption data file (TTML-3) 123 without receiving the caption data file (TTML-2) 122 shown in FIG. 8, and the program is viewed.

In this case, the (a) text string (text 4) for which the display start time is set to the continuous display instruction value (indefinite) can be acquired from the caption data file (TTML-3) 123.

However, the (b) text string that is stored in the memory and is continuously displayed does not exist. Specifically, there is no text string that is stored in the memory and is continuously displayed.

In this case, the caption data processing unit of the reception apparatus 30 performs processing in accordance with only the caption data file (TTML-3) 123.

The caption data processing unit detects, from the TTML caption data file (TTML-3) 123, the following control information of the text string (text 4):

the display start time of the continuous display instruction value (indefinite); and the display end time of 00:00:50.856.

In accordance with the detection information, the caption data processing unit immediately displays the text string (text 4), and finishes the display at the display end time of 00:00:50.856.

As described above, in the case where there is no text string that is stored in the memory and is continuously displayed, the caption data processing unit performs processing of immediately displaying the specified text string in accordance with the control information in which the display start time is the continuous display instruction value (indefinite).

Note that in the embodiment described with reference to FIG. 8, only an example in which only any of the display start time and the display end time is the continuous display instruction value (indefinite) is shown.

However, there exists control information in which both of the display start time and the display end time are the continuous display instruction value (indefinite), i.e., the display start time is the continuous display instruction value (indefinite), and the display end time is the continuous display instruction value (indefinite).

In this case, on the basis of the control information in which the display start time is the continuous display instruction value (indefinite), processing of comparing the (a) text string for which the display start time is set to the continuous display instruction value (indefinite) and the (b) text string that is stored in the memory and continuously displayed will be performed first.

In this comparison processing, only in the case where the (a) is the (b), the text being continuously displayed is continuously displayed as it is and the processing target file is switched.

Further, in accordance with the control information in which the display end time is the continuous display instruction value (indefinite), switching processing to the next TTML caption data file is performed while continuing the text display.

By performing such processing, it is possible to continuously display the same caption data by applying three or more TTML caption data files.

As described above, in this embodiment, in the case where the display end time of the continuous display instruction value (indefinite) is recorded as control information on a particular text string (text x) stored in the TTML caption data file, the caption data processing unit continues the display without deleting the data for displaying the particular text string (text x) from the memory that store the data.

During the display being continued, the caption data processing unit switches the processing target file.

Further, in the case where the display start time of the continuous display instruction value (indefinite) is recorded as control information on the particular text string (text x) stored in the TTML caption data file after the switching, the data for displaying the particular text string (text x) is stored in the memory, and the display is performed, the display is continued.

While continuing the display, the caption data processing unit starts processing on the basis of the processing target file after the switching.

By performing such processing, as shown in FIG. 8, the text string (text 4) is continuously displayed during the time period from the time t7 to the time t10 without interruption at the end of the image reproduction time (t8) of the image/audio data file.

In the example shown in FIG. 8, it is possible to display the text string (text 4) without display interruption during the time period from the display start time specified in the caption data file (TTML-2) 122 to the display end time specified in the caption data file (TTML-3) 122. The display start time is the time t7=00:00:25.008, and the display end time is the time t10=00:00:50.856.

The example shown in FIG. 8 is a processing example using the attribute (end) that represents the caption display end time. Even when the attribute (dur) that represents the display time period (duration) described above with reference to FIG. 7 is used, it is possible to continuously perform the caption display similar to that shown in FIG. 8.

Figure 9:
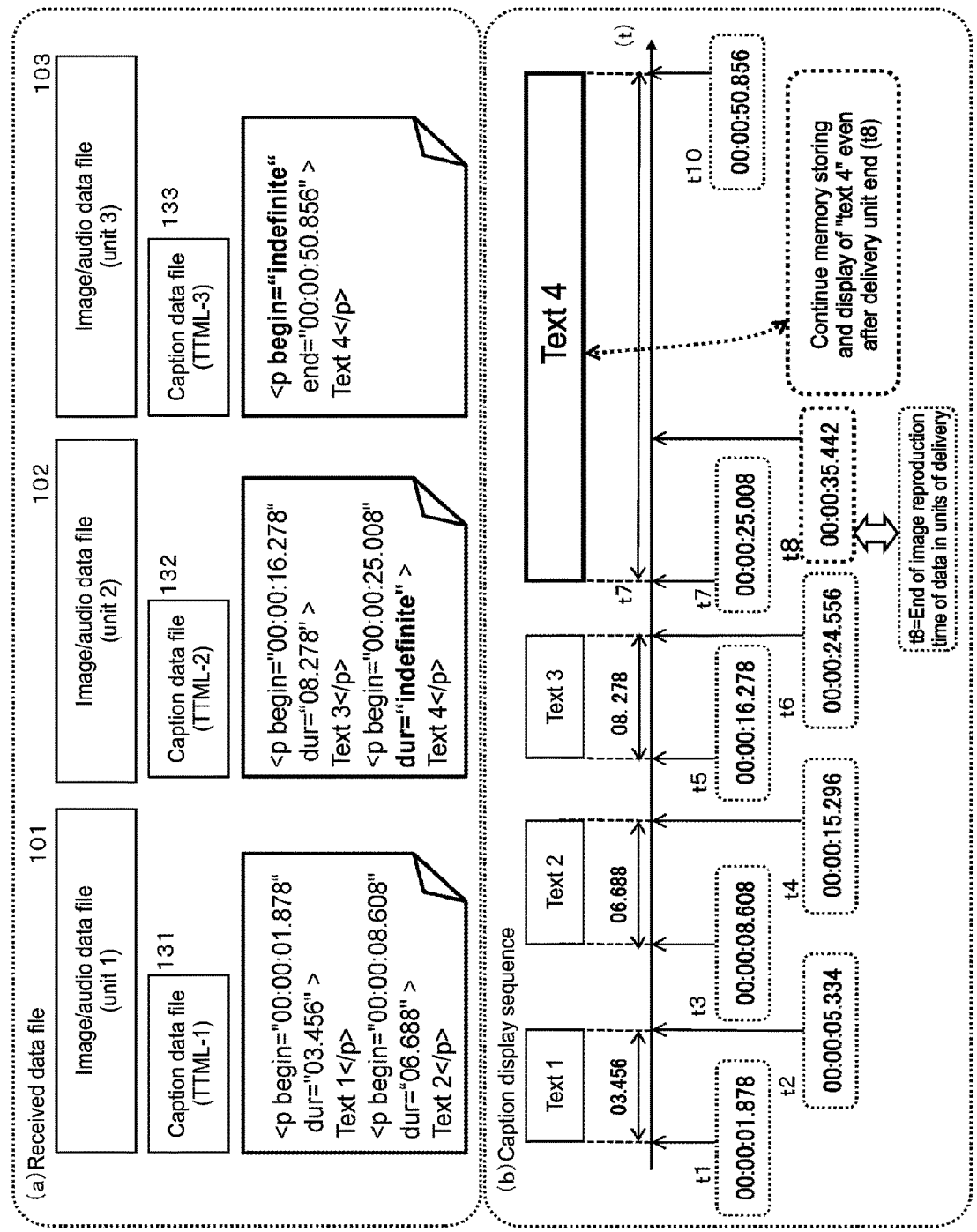
FIG. 9 A diagram explaining the caption display control processing using the TTML caption data in which the caption interruption is prevented from occurring.

FIG. 9 shows an embodiment using the attribute (dur) that represents the display time period (duration).

In a TTML caption data file (TTML-2) 132 shown in FIG. 9, the following data:

```
<p begin="00:00:16.278"
dur="08.278" >
text 3</p>
<p begin="00:00:25.008"
dur="indefinite" >
text 4</p>
``` is stored.

This data represents that:

the display start time is 00:00:16.278, and the display time period is 08.278 seconds regarding the text string (text 3); and the display start time is 00:00:25.008, and the display time period is the continuous display instruction value (indefinite) regarding the text string (text 4).

The processing for dur="indefinite"> being the control information on the text string (text 4) is similar to the processing for end="indefinite"> being the control information described with reference to FIG. 8.

Specifically, the display time period being the continuous display instruction value (indefinite) is the control information for switching files while continuing the display of the display target text.

The image/audio data processing unit of the reception apparatus 30 switches processing to the next image/audio data file 103 when the reproduction end time (t8=00:00:35.442) of the image/audio data file 102 being the main data, which is set as a synchronization processing target with the TTML caption data file (TTML-2) 122 has come.

On the other hand, in the case where the display time period (dur) is set to the continuous display instruction value (indefinite) as control information relating to the text currently displayed on the basis of the TTML caption data being a processing target, the caption data processing unit continues the text display using the data stored in the memory without deleting the text string in the memory, which stores the displayed text string on the display unit. The caption data processing unit switches files in parallel with the text display continuing processing.

In the example shown in FIG. 9, similarly to the examples described above with reference to FIGS. 5 to 7, the reproduction end time (t8=00:00:35.442) of the image/audio data file 102 being the main data, which is set as a synchronization processing target with the TTML caption data file (TTML-2) 132, comes while the text string (text 4) of the TTML caption data file (TTML-2) 132 is displayed.

The caption data processing unit performs the following processing on the basis of confirmation of the display time period (duration) of the text string (text 4) of the TTML caption data (TTML-2) 122 being set to the continuous display instruction value (indefinite).

The caption data processing unit continues the text display using the data (text 4) stored in the memory without deleting the text string in the memory, which stores the displayed text string (text 4) on the display unit.

Further, the caption data processing unit switches files, i.e., performs file switching from the TTML caption data file (TTML-2) 132 to a TTML caption data file (TTML-3) 133 in parallel, while continuing the text display.

The next TTML caption data file (TTML-3) 133 includes the following information:

<p begin="indefinite8" end="00:00:50.856" > text 4</p>.

This data represents that: the display start time is the continuous display instruction value (indefinite) and the display end time is 00:00:50.856 regarding the text string (text 4).

At the time of the file switching, the caption data processing unit of the reception apparatus 30 continues the memory storing and display of the text data (text 4) in accordance with control information (display time period of the text string (text 4) being the continuous display instruction value (indefinite)) on the TTML caption data file (TTML-2) 132 being the previous processing file.

The caption data processing unit switches the processing target file to the TTML caption data file (TTML-3) 133, and detects, from the TTML caption data file (TTML-3) 133 after the switching, the following control information of the text string (text 4):

the display start time of the continuous display instruction value (indefinite); and the display end time of 00:00:50.856.

The caption data processing unit confirms that the text display start time of the text string (text 4) of the TTML caption data (TTML-3) 123 is set to the continuous display instruction value (indefinite).

Based on this confirmation, the caption data processing unit determines whether or not the (a) text string (text 4) for which the display start time is set to the continuous display instruction value (indefinite) and the (b) text string that is stored in the memory and is continuously displayed match.

In the case where the (a) text string and the (b) text string match, the text string currently displayed is stored in the memory as it is, and display of the text string is continued.

It should be noted that the text display control processing is performed on the basis of the file after the file switching, i.e., the TTML caption data (TTML-3) 133.

By this processing target file switching, display of the text string (text 4) is continued until the display end time of t10 being 00:00:50.856 recorded in the TTML caption data file (TTML-3) 133, and finished at the time t10.

By performing such processing, as shown in the (b) part of FIG. 9, the text string (text 4) is continuously displayed without interruption during the file switching.

As described above, it is possible to continuously perform caption display without display interruption along with the file switching, even when any of the attribute (end) that represents the caption display end time and the attribute (dur) that represents the display time period (duration) is used.

Note that in the embodiment described with reference to FIGS. 8 and 9, an example in which the continuous display instruction value set for each attribute (end, begin, or dur) is [indefinite] as the control information for continuously performing caption display has been described. However, this value is only an example, and it is possible to continuously perform caption display similar to the above-mentioned processing by using, for example, [00:00:00.000] or another value as the continuous display instruction value.

In the above-mentioned embodiment, an example in which values set for attributes (end, begin, and dur) are all [indefinite] has been described. However, it is possible to set a different value for each attribute, and perform processing similar to the above-mentioned processing.

5. Regarding Sequence of Caption Display Control

Next, the sequence of caption display control performed in the reception apparatus 30 will be described with reference to FIGS. 10 to 13.

Figure 10:
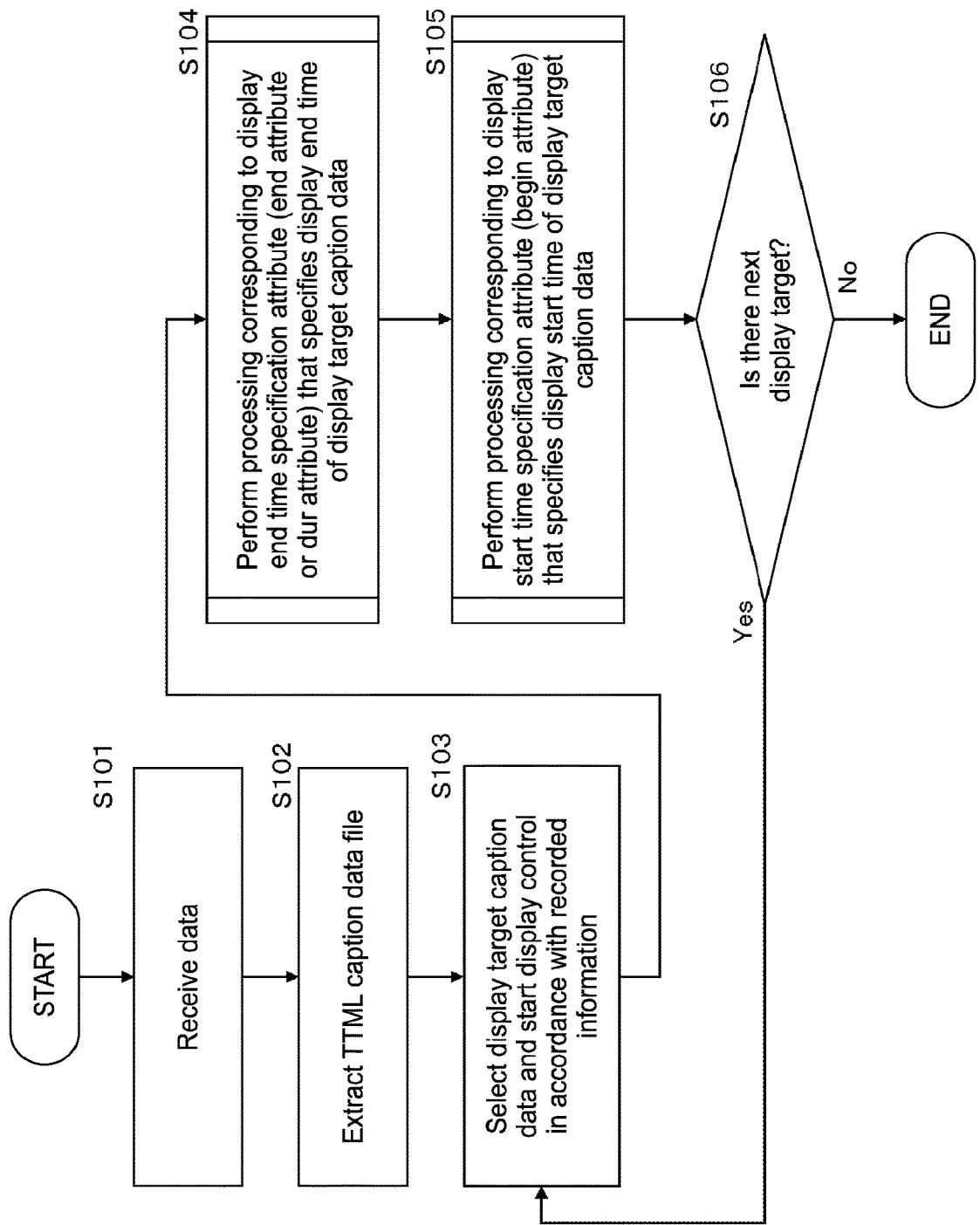
FIG. 10 A diagram showing a flowchart explaining the sequence of the caption display control processing using the TTML caption data in which the caption interruption is prevented from occurring.

The flowchart shown in FIG. 10 is a flow explaining the processing sequence relating to the caption display control performed in the reception apparatus 30.

The processing in accordance with the flow shown in FIG. 10 is performed in accordance with a program stored in a storage unit under the control of the data processing unit including a CPU having a program executing function in the reception apparatus, for example.

Hereinafter, the processing of each Step will be described.

(Step S101)

First, the reception apparatus receives data including image data, audio data, and caption data in Step S101.

The received data includes the TTML caption data.

(Step S102)

Next, the reception apparatus extracts a TTML caption data file from the received data.

As described above with reference to FIGS. 3 and 4 and the like, in the TTML caption data file, the displayed text string and control information such as display timing corresponding to the text string are stored.

(Step S103) The caption data processing unit of the reception apparatus selects, from the TTML caption data file, the caption data being a display target.

The caption data processing unit selects the caption data being a processing target in the order of recorded data of the TTML caption data, and starts the caption display processing in accordance with the control information.

(Step S104)

Next, the caption data processing unit performs processing corresponding to the display end time specification attribute (end attribute or dur attribute) that has specified the display end time of the display target caption data in Step S104.

Figure 11:
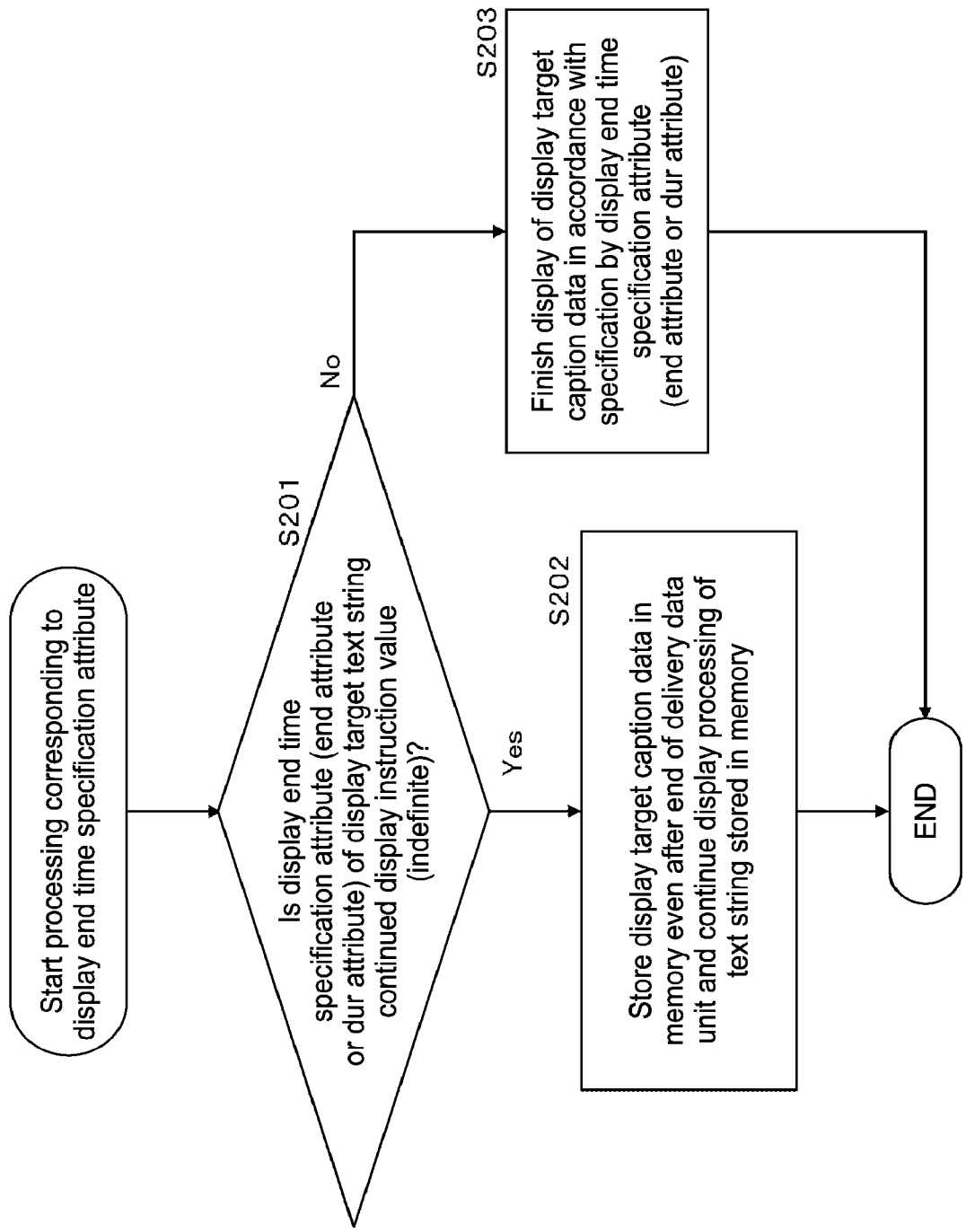
FIG. 11 A diagram showing a flowchart explaining the sequence of the caption display control processing using the TTML caption data in which the caption interruption is prevented from occurring.

The detailed processing of Step S104 will be described with reference to the flow shown in FIG. 11.

(Step S201)

First, the caption data processing unit determines whether or not the display end time specification attribute (end attribute or dur attribute) of the display target text string is the continuous display instruction value (indefinite) in Step S201.

In the case where the attribute is the continuous display instruction value (indefinite), the processing proceeds to Step S202. In the case where the attribute Is not the continuous display instruction value (indefinite), the processing proceeds to Step S203.

(Step S202)

In the case where it is confirmed that the display end time specification attribute (end attribute or dur attribute) of the display target text string is the continuous display instruction value (indefinite), the reception apparatus performs, in Step S202, the following processing: storing the display target caption data in the memory even after the end of delivery data unit (image/audio data file being the main data) and continuing the display processing of the text string stored in the memory.

The caption data processing unit performs switching processing of the TTML caption data files together with switching processing of the image/audio data files being the main data. Also during the file switching processing, the memory storing and display of the text string (text x) of which the display end time specification attribute (end attribute or dur attribute) is confirmed to be the continuous display instruction value (indefinite) are continued.

(Step S203)

On the other hand, in the case where it is confirmed that the display end time specification attribute (end attribute or dur attribute) of the display target text string is not the continuous display instruction value (indefinite), the reception apparatus performs, in Step S203, the following processing: finishing the display of the display target caption data in accordance with the specification by the display end time specification attribute (end attribute or dur attribute).

The processing of Steps S201 to S203 is performed as the processing of Step S104 shown in the flow of FIG. 10.

Thereafter, the processing proceeds to Step S105.

(Step S105)

The caption data processing unit of the reception apparatus performs processing corresponding to the display start time specification attribute (begin attribute) that specifies the display start time of the display target caption data in the next Step S105.

Figure 12:
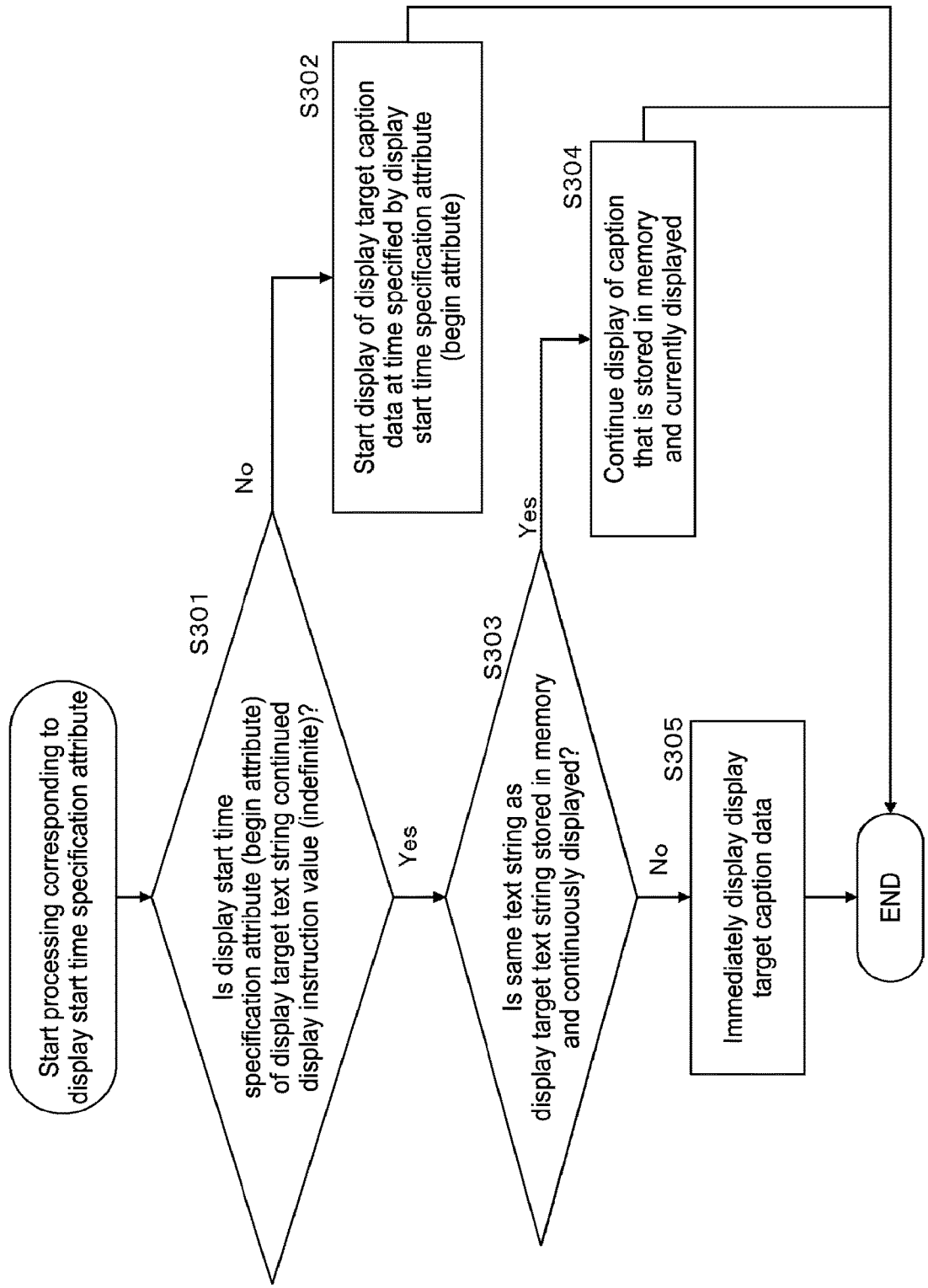
FIG. 12 A diagram showing a flowchart explaining the sequence of the caption display control processing using the TTML caption data in which the caption interruption is prevented from occurring.

The detailed processing of Step S105 will be described with reference to the flow shown in FIG. 12.

(Step S301)

First, the caption data processing unit determines whether or not the display start time specification attribute (begin attribute) of the display target text string is the continuous display instruction value (indefinite) in Step S301.

In the case where the attribute is not the continuous display instruction value (indefinite), the processing proceeds to Step S302. In the case where the attribute is the continuous display instruction value (indefinite), the processing proceeds to Step S303.

(Step S302)

In the case where the display start time specification attribute (begin attribute) of the display target text string is not the continuous display instruction value (indefinite), the caption data processing unit performs, in Step S302, the following processing: display control for starting display of the display target caption data at the time specified by the display start time specification attribute (begin attribute).

(Step S303)

On the other hand, in the case where the display start time specification attribute (begin attribute) of the display target text string is the continuous display instruction value (indefinite), the caption data processing unit performs, in Step S303, the following processing: determining whether or not the same text data as the text string for which the display start time specification attribute (begin attribute) is the continuous display instruction value (indefinite) is stored in the memory and continuously displayed.

In the case where the same text as the text being a processing target is stored in the memory and continuously displayed, the processing proceeds to Step S304, otherwise, the processing proceeds to Step S305.

(Step S304)

In the case where the same text data as the text string for which the display start time specification attribute (begin attribute) is the continuous display instruction value (indefinite) is stored in the memory and continuously displayed, the caption data processing unit performs, in Step S304, the following processing: continuing the display of the caption that is stored in the memory and currently displayed.

(Step S305)

On the other hand, in the case where the same text data as the text string for which the display start time specification attribute (begin attribute) is the continuous display instruction value (indefinite) is not stored in the memory and continuously displayed, the caption data processing unit performs, in Step S305, the following processing: immediately displaying the display target caption data.

Note that the processing performed in this case corresponds to the processing in the case where the reception apparatus receives the caption data file (TTML-3) 123 without receiving the caption data file (TTML-2) 122 and the program (content) is viewed in the middle in the example shown in FIG. 8, for example, as described above.

The processing of Steps S301 to S305 is performed as the processing of Step S105 shown in the flow of FIG. 10.

Thereafter, the processing proceeds to Step S106.

(Step S106)

In Step S106, the caption data processing unit of the reception apparatus determines whether or not there is the next display target caption data, and repeats the processing of Step S103 and subsequent Steps when there is the next display target caption data. When there is no next display target caption data, the caption data processing unit finishes the processing.

Note that in the flow shown in FIG. 10, the processing of Steps S103 to S106 is for one TTML caption data file, and is repeatedly performed every time a new TTML caption data file is received and extracted in Steps S102 and S102.

By performing the processing described with reference to FIGS. 10 to 13, it is possible to continuously perform caption display without caption interruption display when the TTML caption files are switched as described above with reference to FIGS. 8 and 9.

6. Regarding Configuration Examples of Transmission Apparatus and Reception Apparatus Next, configuration examples of the transmission apparatus 20 and the reception apparatus 30 being communication apparatuses will be described with reference to FIG. 13 and subsequent figures.

Figure 13:
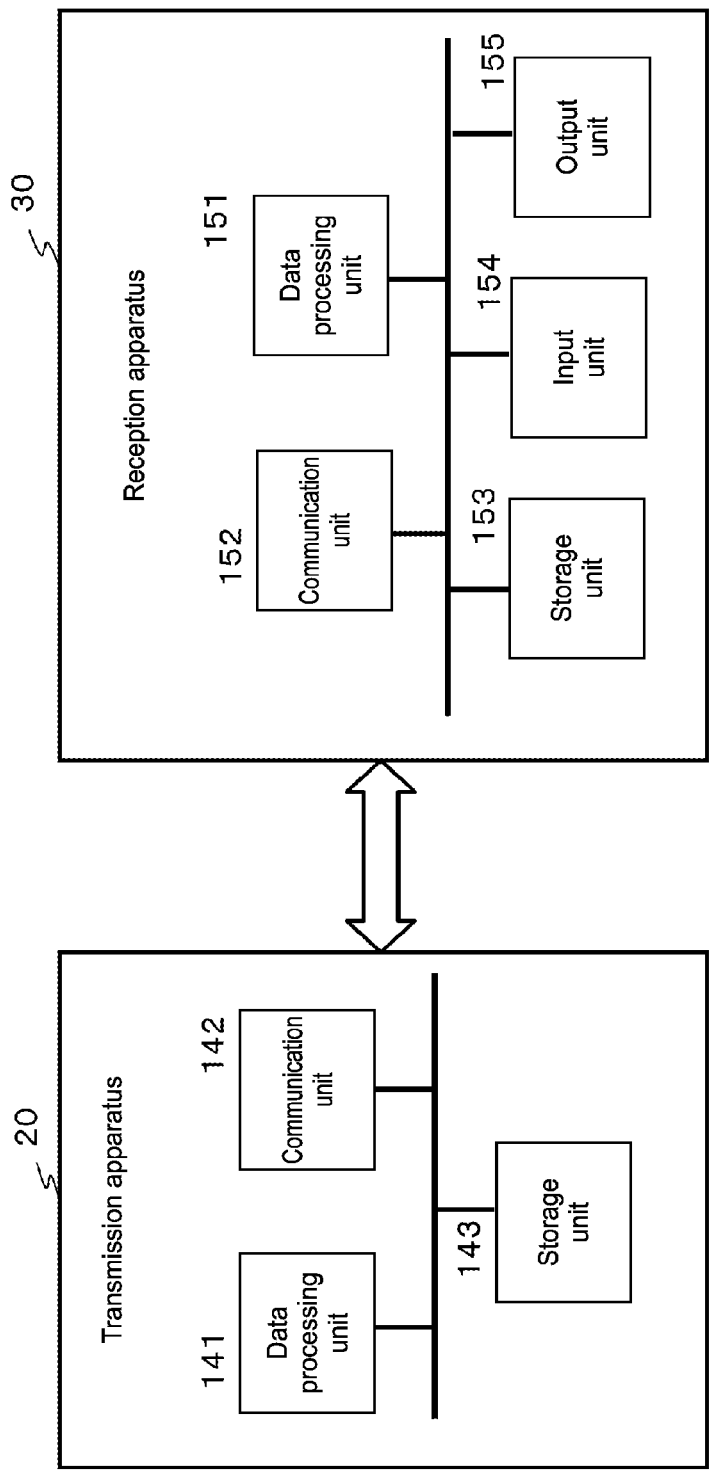
FIG. 13 A diagram explaining configuration examples of a transmission apparatus and a reception apparatus.

FIG. 13 shows configuration examples of the transmission apparatus 20 and the reception apparatus 30.

The transmission apparatus 20 includes a data processing unit 141, a communication unit 142, and a storage unit 143.

The reception apparatus 30 includes a data processing unit 151, a communication unit 152, a storage unit 153, an input unit 154, and an output unit 155.

The data processing unit 141 of the transmission apparatus 20 performs various kinds of data processing for performing a data delivery service. For example, the data processing unit 141 controls the generation or transmission of the data constituting the data delivery service.

Specifically, the data processing unit 141 generates a packet storing the image/audio data, generates a packet storing the caption data and other signaling data, and performs delivery processing.

Note that the packet storing the caption data is a packet storing the TTML caption data in the XML format.

The communication unit 142 performs transmission processing of the control signal on the image, audio, caption, other signaling data, and the like, generated by the data processing unit 141.

The storage unit 143 stores, for example, the data of the image, audio, and caption being a delivery target.

Further, the storage unit 143 is used as a work area for the data processing performed by the data processing unit 141, and also as a storage area for various parameters.

On the other hand, the reception apparatus 30 includes a data processing unit 151, a communication unit 152, a storage unit 153, an input unit 154, and an output unit 155.

The communication unit 152 receives the data delivered from the transmission apparatus 20, e.g., packet storing an image, audio, and captions and signaling data.

The caption data is the TTML caption data.

The data processing unit 151 performs the display control of the caption data in accordance with the above-mentioned embodiment, for example.

Specifically, for example, the data processing unit 151 performs the display control of the caption in accordance with the TTML caption data.

A user's instruction command, e.g., content specifying command, is input via the input unit 154.

The reproduction data is output to the output unit 155 such as a display unit and a speaker.

The storage unit 153 stores the data of the received image, audio, caption, and the like.

Further, the storage unit 153 is used as a work area for the data processing performed by the data processing unit 151, and also as a storage area for various parameters.

Figure 14:
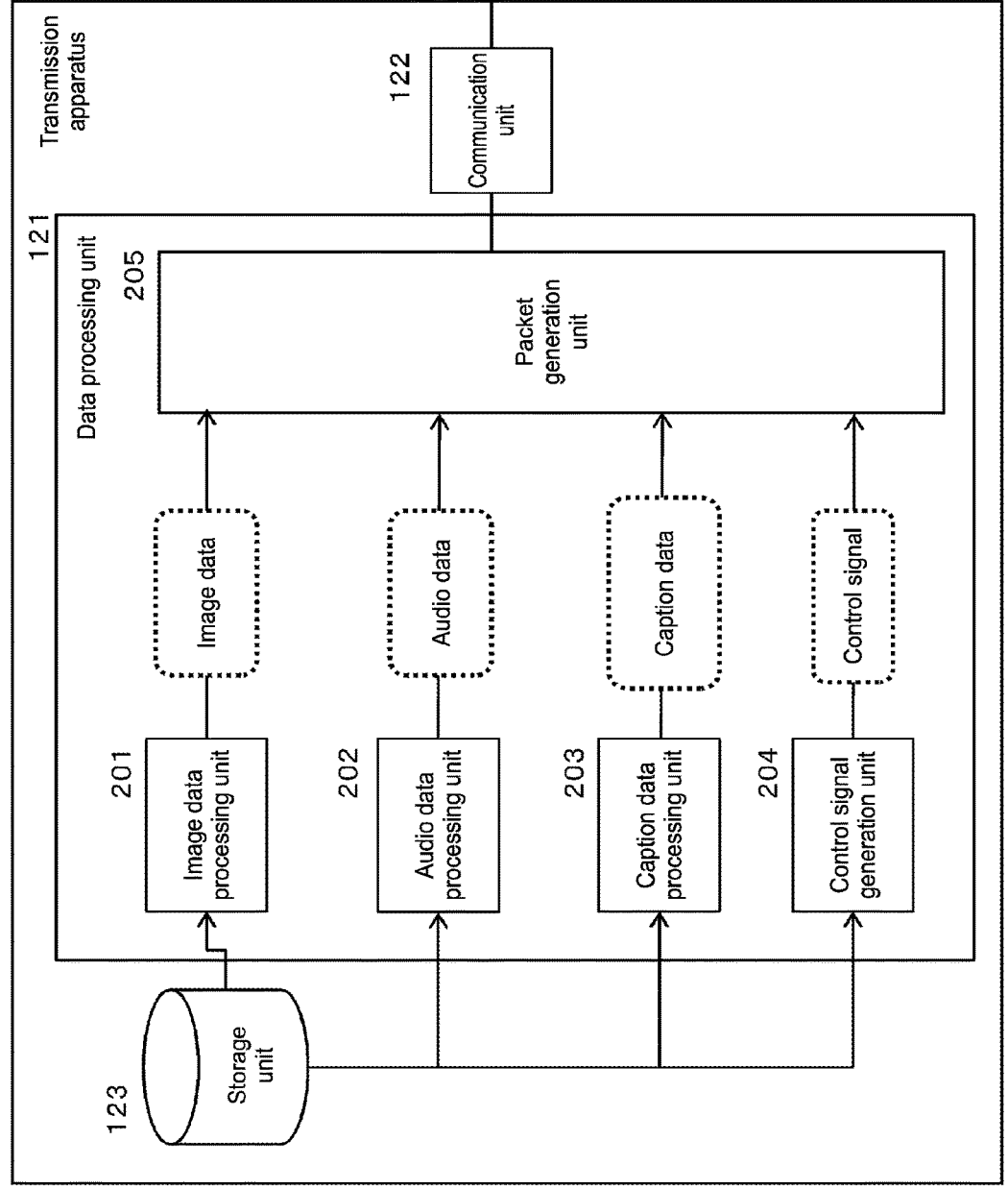
FIG. 14 A diagram explaining a configuration example of the transmission apparatus.

FIG. 14 is a diagram showing the detailed configuration of the data processing unit 141 of the transmission apparatus 20.

The data processing unit 141 includes an image data processing unit 201, an audio data processing unit 202, a caption data processing unit 203, a control signal generation unit 204, and a packet generation unit 205.

The image data processing unit 201 performs processing on the image data being the data constituting the content to be transmitted to the reception apparatus, e.g., processing of generating data for transmission such as encoding processing, generates encoded image data to be stored in a packet, and supplies it to the packet generation unit 205.

The audio data processing unit 202 performs processing on the audio data being the data constituting the content to be transmitted to the reception apparatus, e.g., processing of generating data for transmission such as encoding processing, generates encoded audio data to be stored in a packet, and supplies it to the packet generation unit 205.

The caption data processing unit performs processing on the caption data being the data constituting the content to be transmitted to the reception apparatus.

Specifically, the caption data processing unit performs processing of generating the TTML caption data, and supplies it to the packet generation unit 205.

The control signal generation unit 204 generates a control signal including program information, for example, and outputs it to the packet generation unit 205.

The packet generation unit 205 generates the packet storing the image, audio, caption, and control signal, and supplies it to the communication unit 142.

Note that in the packet generated by the packet generation unit 205, a packet identifier depending on the data type of the image, audio, caption, and the like, is set.

The communication unit 142 outputs, via a broadcast wave or a network, the packet input from the packet generation unit 205.

Figure 15:
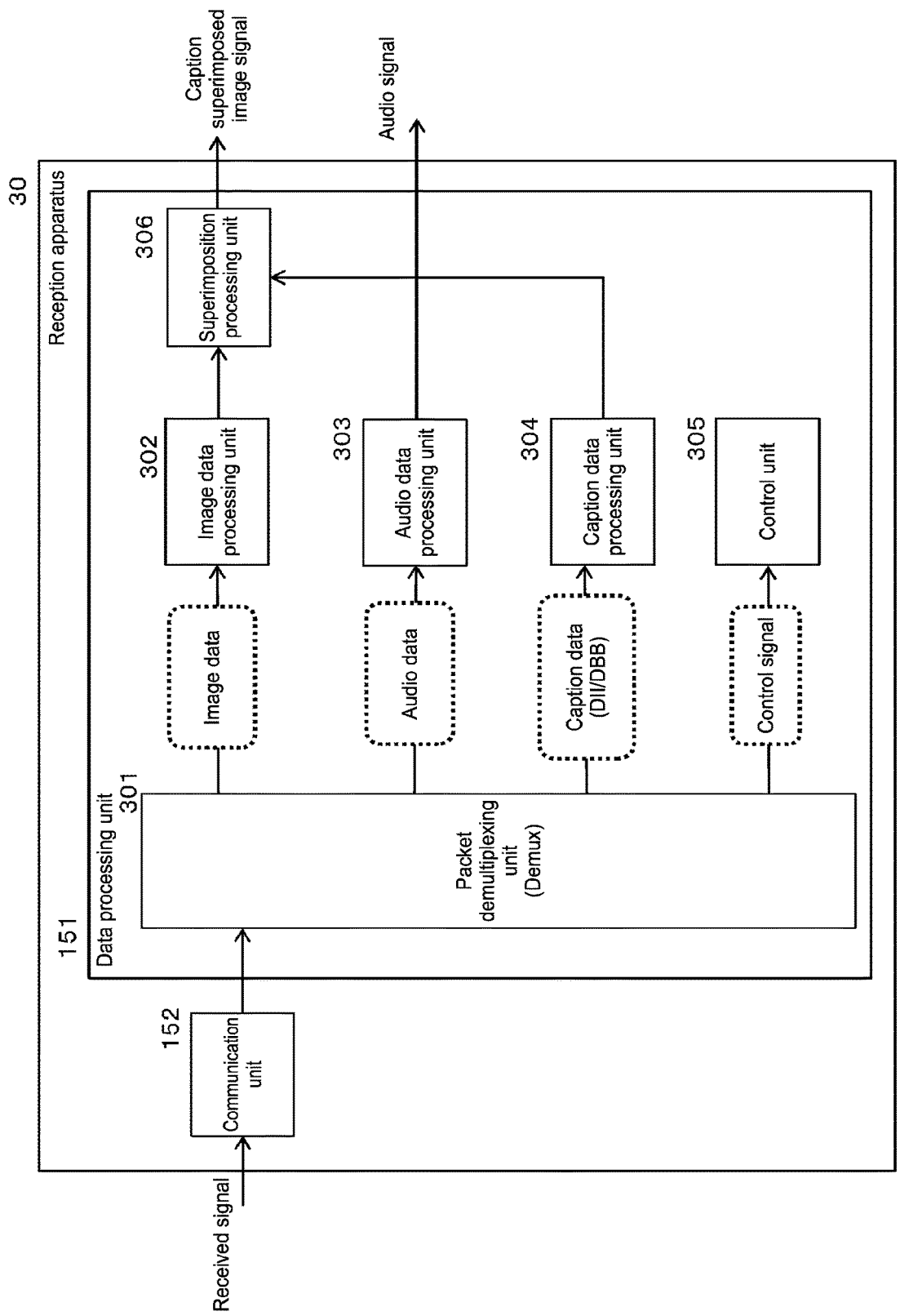
FIG. 15 A diagram explaining a configuration example of the reception apparatus.

FIG. 15 is a diagram showing the detailed configuration of the data processing unit 151 of the reception apparatus 30.

The data processing unit 151 of the reception apparatus 30 includes a packet demultiplexing unit 301, an image data processing unit 302, an audio data processing unit 303, a caption data processing unit 304, a control unit 305, and a superimposition processing unit 306.

The packet demultiplexing unit 301 demultiplexes the received packet for each data type (image, audio, caption, and control signal) on the basis of the packet identifier of the packet received via the communication unit 152, and supplies the demultiplexed packet to each data processing unit.

The image data processing unit 302 acquires image data from the packet storing the image data, and performs processing necessary for reproducing the image such as decoding processing.

The audio data processing unit 303 acquires the audio data from the packet storing the audio data, and performs processing necessary for reproducing the audio such as decoding processing.

The caption data processing unit 304 acquires the TTML caption data from the packet storing the data relating to captions, and controls the output timing of the caption to output the caption by using the control information recorded in the TTML caption data.

In addition to the above-mentioned output of the control signal relating to captions, the control unit 305 controls processing performed in the processing units of the image data processing unit 302, the audio data processing unit 303, the caption data processing unit 304, and the superimposition processing unit 306.

The superimposition processing unit 306 performs superimposition processing of the image data output from the image data processing unit 302 and the caption data output from the caption data processing unit 304, and outputs it to the display unit.

Figure 16:
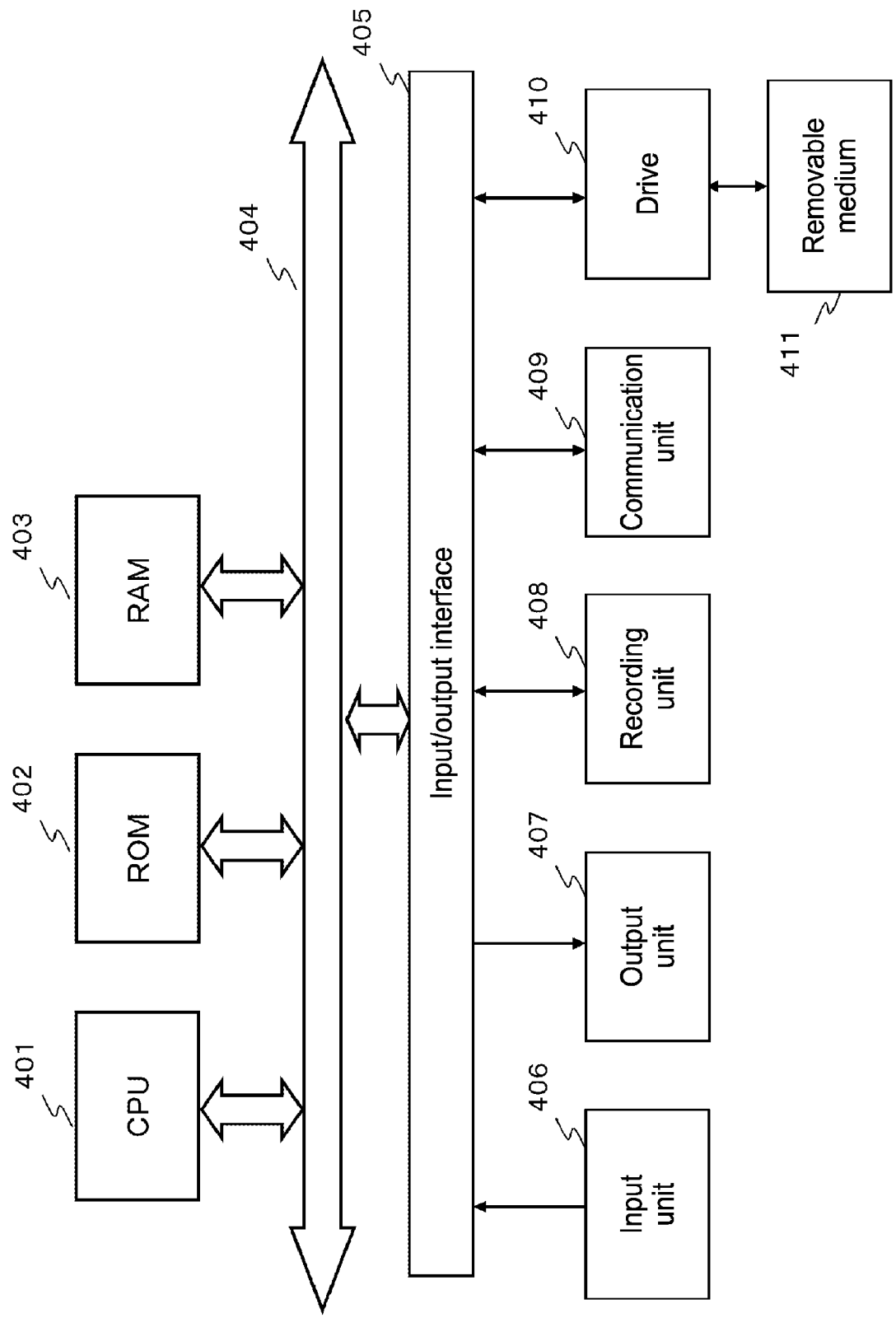
FIG. 16 A diagram explaining hardware configuration examples of the transmission apparatus and the reception apparatus being communication apparatuses.

FIG. 16 shows a configuration example of hardware of a communication apparatus applicable to the transmission apparatus 20 and the reception apparatus 30.

A CPU (Central Processing Unit) 401 functions as a data processing unit that performs various kinds of processing in accordance with a program stored in a ROM (Read Only Memory) 402 or a storage unit 408. For example, the CPU 401 performs the processing in accordance with the sequence described in the above-mentioned embodiment. A RAM (Random Access Memory) 403 stores the program executed by the CPU 401, data, and the like. The CPU 401, the ROM 402, and the RAM 403 are connected to each other by a bus 404.

The CPU 401 is connected to an input/output interface 405 via the bus 404. To the input/output interface 405, an input unit 406 including various switches, a keyboard, a mouse, a microphone, or the like, and an output unit 407 including a display, a speaker, or the like, are connected. The CPU 401 performs various kinds of processing in response to the command input from the input unit 406, and outputs the processing result to the output unit 407, for example.

The storage unit 408 connected to the input/output interface 405 includes, for example, a hard disk, and stores the program executed by the CPU 401 and various kinds of data. A communication unit 409 functions as a transmission/reception unit of data communication via a network such as the Internet and a local area network and as a transmission/reception unit of a broadcast wave, and communicates with an external apparatus.

A drive 410 connected to the input/output interface 405 drives a removable medium 411 such as a magnetic disk, an optical disc, a magneto-optical disk, and a semiconductor memory including a memory card to store or read data.

Note that although encoding or decoding of data can be performed as the processing performed by the CPU 401 serving as the data processing unit, it is possible to provide a codec serving as dedicated hardware for performing encoding processing or decoding processing.

7. Summary of Configuration of Present Disclosure

In the above, the embodiment of the present disclosure has been described with reference to a particular embodiment. However, it is obvious that various modifications or substitutions can be made to the embodiment of the present disclosure by a person skilled in the art without departing from the gist of the present disclosure. In other words, the present disclosure has been described hereinabove merely as an example, and hence should not be limitedly construed. The gist of the present disclosure should be determined with reference to the appended claims.

It should be noted that the present technology may take the following configurations.

(1)

A reception apparatus, including:

a communication unit that receives TTML (Timed Text Markup Language) caption data; and a data processing unit that performs caption display control, the TTML caption data being applied to the caption display control, in which the TTML caption data is data having a continuous display instruction value for performing continuous display processing of captions currently displayed, as a value of at least one of a caption display end time specification attribute and a caption display start time specification attribute.

(2)

The reception apparatus according to (1) above, in which the data processing unit performs control of continuing memory storing and display processing of caption data currently displayed when a set value of the caption display end time specification attribute of the TTML caption data is the continuous display instruction value.

(3)

The reception apparatus according to (1) or (2) above, in which the data processing unit performs control of continuing memory storing and display processing of caption data currently displayed when a set value of the caption display end time specification attribute of the TTML caption data is the continuous display instruction value even after reproduction end timing of an image file, the image file being a synchronization processing file for the TTML caption data.

(4)

The reception apparatus according to any one of (1) to (3) above, in which the data processing unit performs switching processing of TTML caption data files to be processed while continuing memory storing and display processing of caption data currently displayed when a set value of the caption display end time specification attribute of the TTML caption data is the continuous display instruction value.

(5)

The reception apparatus according to any one of (1) to (4) above, in which the data processing unit determines whether or not there is a text string stored in a memory, display processing of the text string being continued, when a set value of the caption display start time specification attribute of the TTML caption data is the continuous display instruction value, determines, when there is the text string, whether or not a text string for which the continuous display instruction value is set is the same as the text string stored in the memory, display processing of the text string being continued, and performs, when they are the same, control of continuously displaying a displayed text.

(6)

The reception apparatus according to any one of (1) to (5) above, in which the data processing unit determines whether or not there is a text string stored in a memory, display processing of the text string being continued, when a set value of the caption display start time specification attribute of the TTML caption data is the continuous display instruction value, and performs, when there is not the text string, control of immediately displaying a text string for which the continuous display instruction value is set.

(7)

The reception apparatus according to any one of (1) to (6) above, in which the caption display end time specification attribute of the TTML caption data is one of an end attribute and a dur attribute.

(8)

The reception apparatus according to any one of (1) to (7) above, in which the caption display start time specification attribute of the TTML caption data is a begin attribute.

(9)

A transmission apparatus, including:

a data processing unit that generates TTML (Timed Text Markup Language) caption data; and a communication unit that transmits the TTML caption data, in which the TTML caption data is data having a continuous display instruction value for performing continuous display processing of captions currently displayed, as a value of at least one of a caption display end time specification attribute and a caption display start time specification attribute.

(10)

The transmission apparatus according to (9) above, in which the data processing unit generates the TTML caption data having a set value of the caption display end time specification attribute, the set value being the continuous display instruction value, and the TTML caption data is data that is capable of causing a caption display processing performing apparatus to continue memory storing and display processing of caption data currently displayed.

(11)

The transmission apparatus according to (9) or (10) above, in which the data processing unit generates the TTML caption data having a set value of the caption display end time specification attribute, the set value being the continuous display instruction value, and the TTML caption data is data that is capable of causing a caption display processing performing apparatus to perform switching processing of TTML caption data files to be processed while continuing memory storing and display processing of caption data currently displayed.

(12)

The transmission apparatus according to any one of (9) to (11) above, in which the data processing unit generates the TTML caption data having a set value of the caption display start time specification attribute, the set value being the continuous display instruction value, and the TTML caption data is data that is capable of causing a caption display processing performing apparatus to determine whether or not there is a text string stored in a memory, display processing of the text string being continued, to determine, when there is the text string, whether or not a text string for which the continuous display instruction value is set is the same as the text string stored in the memory, display processing of the text string being continued, and to perform, when they are the same, control of continuously displaying a displayed text.

(13)

The transmission apparatus according to any one of (9) to (12) above, in which the data processing unit generates the TTML caption data having a set value of the caption display start time specification attribute, the set value being the continuous display instruction value, and the TTML caption data is data that is capable of causing a caption display processing performing apparatus to determine whether or not there is a text string stored in a memory, display processing of the text string being continued, when a set value of the caption display start time specification attribute of the TTML caption data is the continuous display instruction value, and to perform, when there is not the text string, control of immediately displaying a text string for which the continuous display instruction value is set.

(14)

The transmission apparatus according to any one of (9) to (13) above, in which the caption display end time specification attribute of the TTML caption data is one of an end attribute and a dur attribute.

(15)

The transmission apparatus according to any one of (9) to (14) above, in which the caption display start time specification attribute of the TTML caption data is a begin attribute.

(16)

A data processing method executed by a reception apparatus, including:

receiving, by a communication unit, TTML (Timed Text Markup Language) caption data;

performing, by a data processing unit, caption display control, the TTML caption data being applied to the caption display control, in which the TTML caption data is data having a continuous display instruction value for performing continuous display processing of captions currently displayed, as a value of at least one of a caption display end time specification attribute and a caption display start time specification attribute.

(17)

A data processing method executed by a transmission apparatus, including:

generating, by a data processing unit, TTML (Timed Text Markup Language) caption data; and transmitting, by a communication unit, the TTML caption data, in which the TTML caption data is data having a continuous display instruction value for performing continuous display processing of captions currently displayed, as a value of at least one of a caption display end time specification attribute and a caption display start time specification attribute.

A series of processes described in the specification can be executed with hardware, software, or a composite configuration of the hardware and the software. In order that the processes can be executed with the software, programs, which store a sequence of the processes and are installed in a memory in a computer incorporated in dedicated hardware, are executed. Alternatively, the programs to be executed may be installed in a general purpose computer capable of executing various processes. For example, the programs may be recorded in advance in a recording medium, or may be installed from the recording medium to the computer. Alternatively, the programs may be received via networks such as a LAN (Local Area Network) or the Internet, and then installed to recording medium such as a built-in hard disk.

Note that, the various processes described in the specification need not necessarily be executed in time series according to the description, and may be executed in parallel or individually in accordance with processing capabilities of apparatus that execute the processes or as appropriate. Further, the "system" in this specification refers to a logical collective configuration of a plurality of apparatus, and those apparatus having respective configurations are not necessarily provided in the same casing.

As described above, according to the configuration of an embodiment of the present disclosure, it is possible to achieve an apparatus and a method that are capable of performing reliable display control with no caption display interruption of the TTML caption data.

Specifically, when a set value of the caption display end time specification attribute of the TTML caption data is the continuous display instruction value, memory storing and display processing of caption data currently displayed are continued even after reproduction end timing of an image file, and switching processing of TTML caption data files is performed. In the case where a set value of the caption display start time specification attribute of the TTML caption data is the continuous display instruction value, whether or not there is a text string of which display processing is continued is determined, and when there is the text string, the displayed text is continuously displayed.

According to this configuration, it is possible to achieve display control with no caption display interruption of the TTML caption data.

DESCRIPTION OF REFERENCE NUMERALS

10 communication system, 20 transmission apparatus, 21 broadcasting station, 22 data delivery server, 30 reception apparatus, 31 TV, 32 PC, 33 portable terminal, 50 image data, 60 audio data, 70 caption data, 80 signaling data, 101 to 103 image/audio data file, 111 to 113 caption data file (TTML), 121 to 123 caption data file (TTML), 141 data processing unit, 142 communication unit, 143 storage unit, 151 data processing unit, 152 communication unit, 153 storage unit, 154 input unit, 155 output unit, 201 image data processing unit, 202 audio data processing unit, 203 caption data processing unit, 204 control signal generation unit, 205 packet generation unit, 301 packet demultiplexing unit, 302 image data processing unit, 303 audio data processing unit, 304 caption data processing unit, 305 control unit, 306 superimposition processing unit, 401 CPU, 402 ROM, 403 RAM, 404 bus, 405 input/output interface, 406 input unit, 407 output unit, 408 storage unit, 409 communication unit, 410 drive, 411 removable medium

The invention claimed is:

1. A reception apparatus, comprising:
processing circuitry configured to:
receive plural Timed Text Markup Language (TTML) caption data files, each TTML caption data file of the plural TTML caption data files includes a value of at least one of a caption display end time specification attribute, a duration time specification attribute, and a caption display start time specification attribute;
perform a caption display control with a first TTML caption data file of the plural TTML caption data files;
determine whether the caption display end time specification attribute or the duration time specification attribute of the first TTML caption data file includes a text string that indicates a continuous display instruction value instead of a time value;
in response to a determination that the caption display end time specification attribute or the duration time specification attribute includes the continuous display instruction value, the processing circuitry is configured to:
perform continuous display processing of first caption data associated with the continuous display instruction value until a next TTML caption data file is processed.

2. The reception apparatus according to claim 1, wherein the processing circuitry continues to perform the continuous display processing of the first caption data, after reproduction end timing of an image file, the image file being a synchronization processing file for the TTML caption data file.

3. The reception apparatus according to claim 1, wherein the processing circuitry
determines whether the continuous display processing of the first caption data is performed, when a set value of the caption display start time specification attribute of a second TTML caption data file of the plural TTML caption data files is a continuous display instruction value for performing continuous display processing of second caption data captions,
determines, when the continuous display processing of the first caption data is performed, whether or not the first caption data is the same as the second caption data, and
performs, when the first caption data and the second caption data are the same, control of continuously displaying the first caption data.

4. The reception apparatus according to claim 1, wherein the processing circuitry
determines whether the continuous display processing of the first caption data is performed, when a set value of the caption display start time specification attribute of a second TTML caption data file of the plural TTML caption data files is a continuous display instruction value for performing continuous display processing of second caption data, and
performs, when the continuous display processing of the first caption data is not performed, control of immediately displaying the second caption data.

5. The reception apparatus according to claim 1, wherein the caption display end time specification attribute of the TTML caption data files is one of an end attribute and a duration attribute.

6. The reception apparatus according to claim 1, wherein the caption display start time specification attribute of the TTML caption data files is a begin attribute.

7. A transmission apparatus, comprising:
processing circuitry configured to:
generate plural Timed Text Markup Language (TTML) caption data files, each TTML caption data file of the plural TTML caption data files includes a value of at least one of a caption display end time specification attribute, a duration time specification attribute, and a caption display start time specification attribute; and
transmit the plural TTML caption data files, wherein
a reception apparatus receiving the transmitted TTML caption data files is configured to
in response to a determination that the caption display end time specification attribute or the duration time specification attribute of a first TTML caption data file of the transmitted TTML caption data files includes a text string that indicates a continuous display instruction value instead of a time value,
control continuous display processing of first caption data associated with the continuous display instruction value until a next TTML caption data file is processed.

8. The transmission apparatus according to claim 7, wherein
the processing circuitry generates the first TTML caption data file having the caption display end time specification attribute being the continuous display instruction value.

9. The transmission apparatus according to claim 7, wherein
the processing circuitry generates a second TTML caption data file of the plural TTML caption data files having the caption display start time specification attribute being the continuous display instruction value for performing continuous display processing of second caption data, and
the second TTML caption data file causes the reception apparatus to
determine whether the continuous display processing of the first caption data is performed,
determine, when the continuous display processing of the first caption data is performed, whether or not the first caption data is the same as the second caption data, and
perform, when the first caption data and the second caption data are the same, control of continuously displaying the first caption data.

10. The transmission apparatus according to claim 7, wherein
the processing circuitry generates a second TTML caption data file of the plural TTML caption data files having the caption display start time specification attribute being the continuous display instruction value for performing continuous display processing of second caption data, and the second TTML caption data file causes the reception apparatus to determine whether the continuous display processing of the first caption data is performed, and perform, when the continuous display processing of the first caption data is not performed, control of immediately displaying the second caption data.

11. The transmission apparatus according to claim 7, wherein the caption display end time specification attribute of the TTML caption data files is one of an end attribute and a duration attribute.

12. The transmission apparatus according to claim 7, wherein the caption display start time specification attribute of the TTML caption data files is a begin attribute.

13. A data processing method executed by a reception apparatus, comprising:

receiving, by processing circuitry of the reception apparatus, plural Timed Text Markup Language (TTML) caption data files, each TTML caption data file of the plural TTML caption data files includes a value of at least one of a caption display end time specification attribute, a duration time specification attribute, and a caption display start time specification attribute;

performing, by the processing circuitry, a caption display control with a first TTML caption data file of the plural TTML caption data files;

determining whether the caption display end time specification attribute or the duration time specification attribute of the first TTML caption data file includes a text string that indicates a continuous display instruction value instead of a time value;

in response to a determination that the caption display end time specification attribute or the duration time specification attribute includes the continuous display instruction value, performing continuous display processing of first caption data associated with the continuous display instruction value until a next TTML caption data file is processed.

14. A data processing method executed by a transmission apparatus, comprising:

generating, by processing circuitry of the transmission apparatus, plural Timed Text Markup Language (TTML) caption data files, each TTML caption data file of the plural TTML caption data files includes a value of at least one of a caption display end time specification attribute, a duration time specification attribute, and a caption display start time specification attribute; and transmitting, by the processing circuitry, the plural TTML caption data files, wherein a reception apparatus receiving the transmitted TTML caption data files is configured to in response to a determination that the caption display end time specification attribute or the duration time specification attribute of a first TTML caption data file of the transmitted TTML caption data files includes a text string that indicates a continuous display instruction value instead of a time value, control continuous display processing of first caption data associated with the continuous display instruction value until a next TTML caption data file is processed.

* * * * *